US011736321B2

(12) United States Patent
Sverdlov et al.

(10) Patent No.: US 11,736,321 B2
(45) Date of Patent: Aug. 22, 2023

(54) ONLINE SPUR DETECTION AND MITIGATION

(71) Applicant: QUALCOMM Incorporated, San Diego, CA (US)

(72) Inventors: Alexander Sverdlov, Rehovot (IL); Michael Levitsky, Rehovot (IL); Assaf Touboul, Netanya (IL); Gideon Shlomo Kutz, Ramat Hasharon (IL); Guy Wolf, Rosh Haayin (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/583,069

(22) Filed: Jan. 24, 2022

(65) Prior Publication Data

US 2023/0239181 A1    Jul. 27, 2023

(51) Int. Cl.
| | | |
|---|---|---|
| *H04B 1/04* | (2006.01) | |
| *H04L 25/03* | (2006.01) | |
| *H04B 1/10* | (2006.01) | |
| *H04L 25/02* | (2006.01) | |

(52) U.S. Cl.
CPC ..... *H04L 25/03178* (2013.01); *H04B 1/0475* (2013.01); *H04B 1/10* (2013.01); *H04L 25/0202* (2013.01)

(58) Field of Classification Search
CPC ............ H04L 25/0202; H04L 27/2614; H04L 25/03968; H04L 25/0236; H04L 25/03286; H04L 25/0328; H04L 25/03821; H04L 25/03006; H04B 1/0475
USPC .............. 375/232, 262, 267, 316, 343, 346, 375/348–350
See application file for complete search history.

(56) References Cited

U.S. PATENT DOCUMENTS

| | | | | |
|---|---|---|---|---|
| 8,693,971 | B1 * | 4/2014 | Balraj | H04B 7/0417 375/216 |
| 9,031,123 | B2 * | 5/2015 | de Victoria | H04L 1/0038 375/267 |
| 10,624,088 | B2 * | 4/2020 | Beale | H04L 5/0091 |
| 11,197,279 | B1 * | 12/2021 | Jia | H04L 1/1692 |
| 2008/0101212 | A1 | 5/2008 | Yu et al. | |

(Continued)

OTHER PUBLICATIONS

International Search Report and Written Opinion—PCT/US2023/060910—ISA/EPO—dated May 12, 2023.

*Primary Examiner* — Emmanuel Bayard
(74) *Attorney, Agent, or Firm* — Holland & Hart LLP

(57) ABSTRACT

Methods, systems, and devices for wireless communications are described. A user equipment (UE) may perform online spur detection and mitigation scheme. The UE may identify spurs during operation, in real time, and apply cancelation and noise equalization to address identified spurs. The UE may apply a high pass filter to reference signals. During a symbol, the UE may apply the high pass filter by estimating the channel on one or more neighbor tones (e.g., tones of higher frequency and tones of lower frequency that also carry reference symbols). Because the UE may assume that a channel will generally be smooth, and that noise may vary slowly or steadily across frequency resources, the UE may compare the channel noise of a particular tone to an average or normalized channel noise of the one or more neighbor tones.

30 Claims, 14 Drawing Sheets

(56) References Cited

U.S. PATENT DOCUMENTS

| | | | |
|---|---|---|---|
| 2010/0166119 A1* | 7/2010 | Wang | H04L 25/03038 |
| | | | 375/341 |
| 2011/0026619 A1 | 2/2011 | Kent et al. | |
| 2011/0164709 A1 | 7/2011 | Park et al. | |
| 2013/0260744 A1* | 10/2013 | Xu | H04W 88/02 |
| | | | 455/423 |
| 2015/0358104 A1* | 12/2015 | Ohwatari | H04L 5/005 |
| | | | 370/252 |
| 2016/0057760 A1* | 2/2016 | Yokomakura | H04W 72/0473 |
| | | | 370/329 |
| 2016/0173175 A1* | 6/2016 | Tomeba | H04B 7/0452 |
| | | | 370/329 |
| 2016/0254869 A1* | 9/2016 | Wen | H04L 5/0073 |
| | | | 370/330 |
| 2017/0041097 A1* | 2/2017 | Kim | H04J 11/0023 |
| 2017/0094674 A1* | 3/2017 | Kobayashi | H04W 16/14 |
| 2017/0208500 A1* | 7/2017 | Jung | H04L 25/0204 |
| 2018/0083811 A1* | 3/2018 | Kumpula | H04L 25/03159 |
| 2021/0036733 A1 | 2/2021 | Landis et al. | |
| 2022/0158870 A1* | 5/2022 | Hewavithana | H04L 25/0244 |

\* cited by examiner

US 11,736,321 B2

ONLINE SPUR DETECTION AND MITIGATION

FIELD OF TECHNOLOGY

The following relates to wireless communications, including online spur detection and mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may experience channel noise, which may include highly localized spikes in channel noise that may impact channel estimation and signal decoding.

SUMMARY

The described techniques relate to improved methods, systems, devices, and apparatuses that support online spur detection and mitigation. Generally, a user equipment (UE) may perform online spur detection and mitigation. For example, the UE may identify spurs during operation, in real time, and apply cancelation and noise equalization to address identified spurs. The UE may apply a high pass filter to descrambled reference signals in the frequency domain (FD) (e.g., demodulation reference signals (DMRSs)) which may be transmitted together with a physical downlink shared channel (PDSCH) for performing channel estimation of a received signal. During a symbol, the UE may apply the high pass filter on descrambled tones (e.g., typically short-length length). Because the UE may assume that a channel will generally be smooth and slow varying, and that noise and spurs may change fast between the neighbor frequency resources, the UE may compare the channel noise power of a particular tone to an average or normalized channel noise power of the one or more neighbor tones.

A method for wireless communications at a user equipment (UE) is described. The method may include monitoring a set of multiple reference signal tones of a first symbol period to identify a noise spur at a first reference signal tone of the set of multiple reference signal tones, generating a channel estimate corresponding to the first reference signal tone based on performing a spur reduction procedure on the first reference signal tone, performing noise equalization on at least a second tone, of a second symbol period, adjacent to the first reference signal tone, and demodulating the second tone based on the noise equalization and the channel estimate.

An apparatus for wireless communications at a UE is described. The apparatus may include a processor, memory coupled with the processor, and instructions stored in the memory. The instructions may be executable by the processor to cause the apparatus to monitor a set of multiple reference signal tones of a first symbol period to identify a noise spur at a first reference signal tone of the set of multiple reference signal tones, generate a channel estimate corresponding to the first reference signal tone based on performing a spur reduction procedure on the first reference signal tone, perform noise equalization on at least a second tone, of a second symbol period, adjacent to the first reference signal tone, and demodulate the second tone based on the noise equalization and the channel estimate.

Another apparatus for wireless communications at a UE is described. The apparatus may include means for monitoring a set of multiple reference signal tones of a first symbol period to identify a noise spur at a first reference signal tone of the set of multiple reference signal tones, means for generating a channel estimate corresponding to the first reference signal tone based on performing a spur reduction procedure on the first reference signal tone, means for performing noise equalization on at least a second tone, of a second symbol period, adjacent to the first reference signal tone, and means for demodulating the second tone based on the noise equalization and the channel estimate.

A non-transitory computer-readable medium storing code for wireless communications at a UE is described. The code may include instructions executable by a processor to monitor a set of multiple reference signal tones of a first symbol period to identify a noise spur at a first reference signal tone of the set of multiple reference signal tones, generate a channel estimate corresponding to the first reference signal tone based on performing a spur reduction procedure on the first reference signal tone, perform noise equalization on at least a second tone, of a second symbol period, adjacent to the first reference signal tone, and demodulate the second tone based on the noise equalization and the channel estimate.

Some examples of the method, apparatuses, and non-transitory computer-readable medium described herein may further include operations, features, means, or instructions for applying a high pass filter to the set of multiple reference signal tones based on the monitoring, where identifying the noise spur may be based on applying the high pass filter.

Some examples of the method, apparatuses, and non-transitory computer-readable medium described herein may further include operations, features, means, or instructions for estimating a first channel noise level for at least a second reference signal tone of the set of multiple reference signal tones, detecting a second channel noise level for the first reference signal tone, and identifying the noise spur at the first reference signal tone based on the first channel noise level and the second channel noise level.

Some examples of the method, apparatuses, and non-transitory computer-readable medium described herein may further include operations, features, means, or instructions for determining to apply the high pass filter based on the first channel noise level differing from the second channel noise level by at least a threshold amount.

In some examples of the method, apparatuses, and non-transitory computer-readable medium described herein, a signal received via the first reference signal tone, and the second reference signal tone, may be communicated using a same set of one or more parameters.

In some examples of the method, apparatuses, and non-transitory computer-readable medium described herein, the one or more parameters include a port combination, an orthogonal cover code set, a port comb, or any combination thereof.

In some examples of the method, apparatuses, and non-transitory computer-readable medium described herein, identifying the noise spur may include operations, features, means, or instructions for identifying a location of a center of the spur, where the spur reduction procedure may be performed corresponding to the location of the center of the spur.

In some examples of the method, apparatuses, and non-transitory computer-readable medium described herein, performing the noise equalization may include operations, features, means, or instructions for performing a channel estimation procedure to the first reference signal tone to determine a first channel estimate, adjusting the channel estimate by removing a noise spur estimate determined by the spur reduction procedure for the noise spur to generate the channel estimate corresponding to the first reference signal tone, and performing a noise equalization procedure on the second tone of the second symbol using one or more noise whitening parameters corresponding to the noise spur estimate.

In some examples of the method, apparatuses, and non-transitory computer-readable medium described herein, performing the noise equalization may include operations, features, means, or instructions for performing a channel noise estimation procedure for the first reference signal tone based on the spur reduction procedure, adjusting the channel noise estimation by adding the noise spur to the estimated channel noise of the first reference signal tone, and reducing the noise for the second tone of the second symbol by applying the noise equalization procedure using one or more noise whitening parameters corresponding to the adjusted channel.

Some examples of the method, apparatuses, and non-transitory computer-readable medium described herein may further include operations, features, means, or instructions for receiving a reference signal via the set of multiple reference signal tones, where the reference signal includes a demodulation reference signal.

Some examples of the method, apparatuses, and non-transitory computer-readable medium described herein may further include operations, features, means, or instructions for receiving data on the second tone based on demodulation the second tone.

In some examples of the method, apparatuses, and non-transitory computer-readable medium described herein, a frequency resource of the second tone may be the same as a frequency resource of the first reference signal tone.

Some examples of the method, apparatuses, and non-transitory computer-readable medium described herein may further include operations, features, means, or instructions for decoding one or more bits from the second tone based on the demodulating.

DETAILED DESCRIPTION

Figure 1:
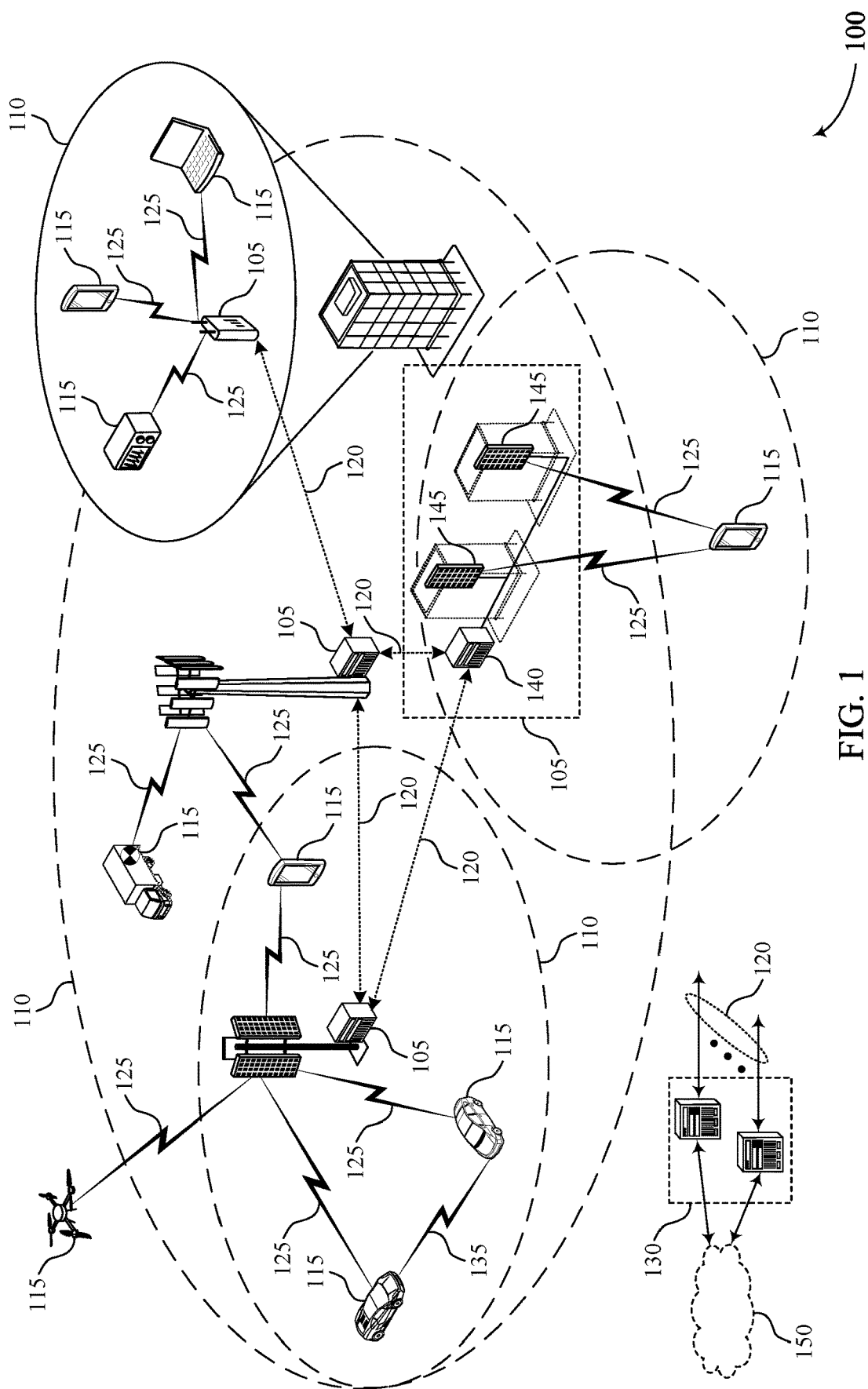
FIG. 1 illustrates an example of a wireless communications system that supports online spur detection and mitigation in accordance with aspects of the present disclosure.

In some wireless communications systems, a user equipment (UE) performing wireless signaling may experience spurs in the frequency band in which the UE is operating. For example, intermodulation between different oscillator signals of a radio frequency frontend at the UE may result in channel noise at a specific tone in the frequency domain that is much greater than channel noise at tones that neighbor the specific tone. For instance, a Fourier transform of a sample converted to the frequency domain may show a naturally occurring amount of thermal noise. For some tones, there may be a spike in noise that significantly exceeds an average thermal noise across a channel. Such spikes in noise may be referred to as spurs,len which may occur at any location within an allocated bandwidth. Spurs may be strong enough to cause sever performance degradation for a receiving UE, especially in cases of high modulation and coding scheme (MCS) allocations. For example, a channel estimation performed across many tones may be inaccurate because one or more spurs at a specific tone may raise an average channel noise much higher than an actual amount of channel noise experienced across the rest of the tones. Inaccurate channel estimation may result in failed decoding and degraded quality of communications, especially for the UE is communicating using a high MCS allocation.

In some examples, a UE may perform a characterization-based spur identification procedure in which measurements are performed under specific conditions (for example, in a laboratory) to build a spur database. The database may be used during operational flows for any device, under the assumption that spurs will occur at specific tones under certain conditions (e.g., as indicated in the database). However, real-time conditions may not match laboratory conditions, and spurs may occur differently based on different thermal conditions, use cases, user handling, or the like. Additionally, or alternatively, spurs may change in location (e.g., may occur at different frequency resources) and in level (e.g., having different power levels) over time. Thus, a characterization-based spur identification and mitigation procedure may lack the flexibility and real-time responsiveness to effectively address spurs and avoid communication degradation.

In some examples, as described herein, a UE may perform online spur detection and mitigation scheme. For example, the UE may identify spurs during operation, in real time, and apply cancelation and noise equalization to address identified spurs. The UE may apply a high pass filter to reference signals (e.g., demodulation reference signals (DMRSs)) which may be transmitted together with a physical downlink shared channel (PDSCH) for performing channel estimation of a received signal. During a symbol, the UE may apply the high pass filter on the descrambled tones (e.g., typically short-length length). Because the UE may assume that a channel will generally be smooth and slow varying, and that noise and spurs change fast between the neighbor frequency resources, the UE may compare the channel noise power of a particular tone to an average or normalized channel noise power of the one or more neighbor tones.

If the channel noise power of a particular tone exceeds the average or normalized channel noise power (e.g., by more than a threshold), then the UE may determine that a spur is located at that tone. The UE may remove the spur from the channel for that tone and may perform channel estimation during the symbol based on the clean channel (e.g., without the spur).

A UE described herein may perform aspects of a noise equalization method. For example, the UE may then perform noise equalization for the identified tone on which the spur is located for one or more adjacent (e.g., next and previous) symbols. The UE may add the spur back to the channel noise and may generate one or more noise whitening parameters (e.g., a noise whitening matrix). The noise whitening matrix may be used for the symbol equalization, and may be used to improve the performance of a decoder at the UE, and to provide that a noise PSD is equal across all the symbols.

A UE described herein may perform aspects of a spur removal method. For example, based on the channel estimation of the clean channel and the detected spur, the UE may determine parameters based on which the UE may reduce the overall or average channel noise during the adjacent symbol, thus mitigating the effect of the spur both during the first symbol (on the reference signal tones) and during a next symbol (on the same tones that may carry data during the next symbol).

Aspects of the disclosure are initially described in the context of wireless communications systems. Aspects of the disclosure are further illustrated by and described with reference to frequency spur detection schemes, timelines, and flow diagrams. Aspects of the disclosure are further illustrated by and described with reference to apparatus diagrams, diagrams, and flowcharts that relate to online spur detection and mitigation.

FIG. 1 illustrates an example of a wireless communications system 100 that supports online spur detection and mitigation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, as described herein, a UE 115 may perform online spur detection and mitigation scheme. For example, the UE 115 may identify spurs during operation, in real time, and apply cancelation and noise equalization to address identified spurs. The UE 115 may apply a high pass filter to the descrambled reference signals in the FD (e.g., demodulation reference signals (DMRSs)) which may be transmitted together with a physical downlink shared channel (PDSCH) for performing channel estimation of a received signal. During a symbol, the UE 115 may apply the high pass filter on the descrambled tones (e.g., typically short-length length). Because the UE 115 may assume that a channel will generally be smooth and slow varying, and that noise and spurs change fast across frequency resources, the UE 115 may compare the channel noise power of a particular tone to an average or normalized channel noise power of the one or more neighbor tones.

Figure 2:
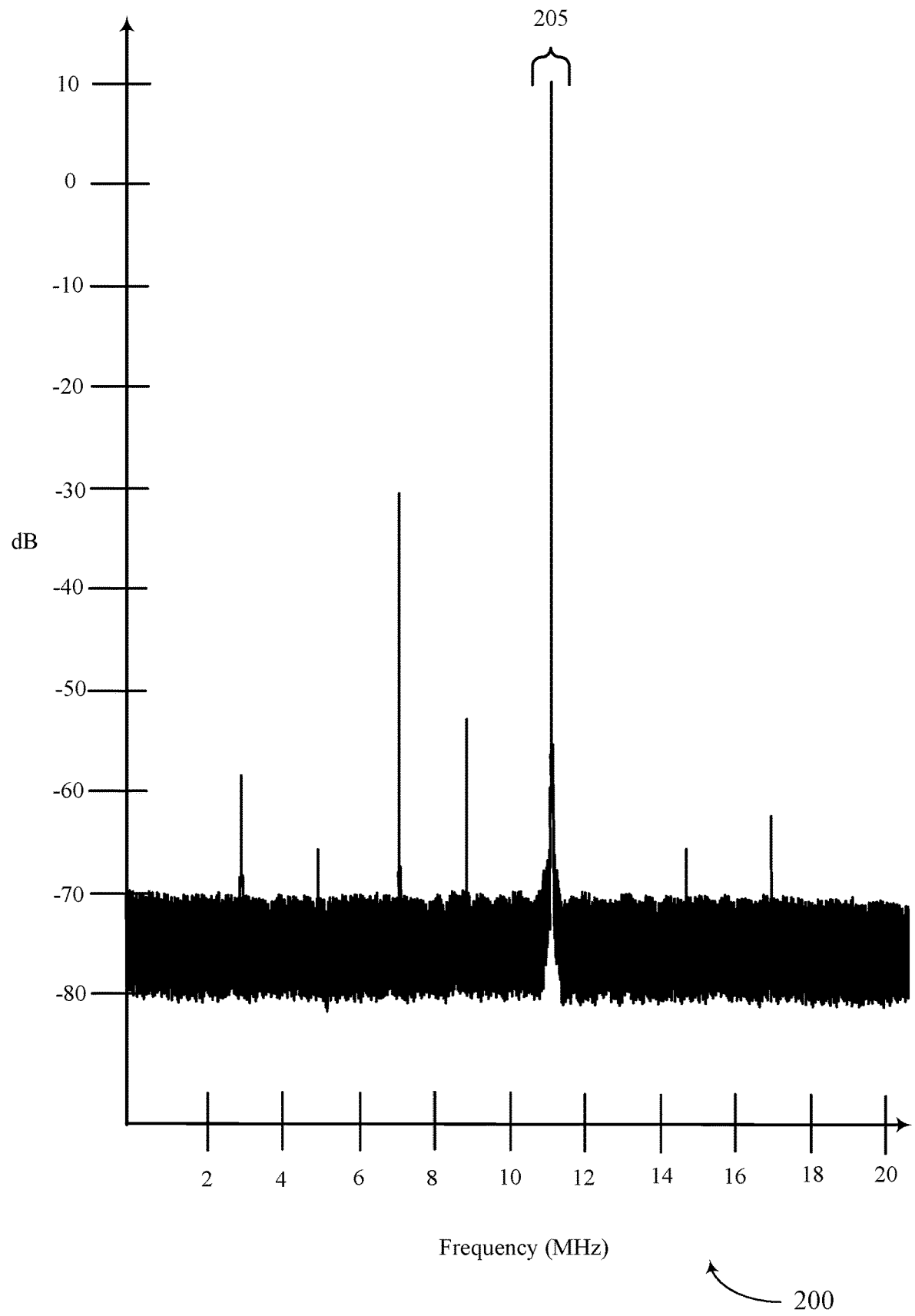
FIG. 2 illustrates an example of a spur detection scheme that supports online spur detection and mitigation in accordance with aspects of the present disclosure.

FIG. 2 illustrates an example of a spur detection scheme 200 that supports online spur detection and mitigation in accordance with aspects of the present disclosure. The spur detection scheme 200 may implement or be implemented by aspects of wireless communications system 100. For example, a wireless device (e.g., a UE), which may correspond to similar devices (e.g., UEs 115) described with reference to FIG. 1, may perform the spur detection scheme 200.

In some examples of a wireless communications system, wireless devices may communicate with each other via time and frequency resources, as described with reference to FIG. 1. A wireless device (e.g., a UE) may receive signaling over frequency resources (e.g., across one or more allocated bandwidths). For instance, the UE may receive signaling across a number of frequency resources (e.g., across 20 MHz).

The UE may experience one or more spurs at a particular frequency within the FD. For example, the UE may perform a Fourier Transform of a sample, and may convert a received stream into the FD, as illustrated with reference to the spur detection scheme 200. The converted stream may be ideally represented by a flat power spectral density (PSD). Measured channel noise may be similar across all frequencies (e.g., may fluctuate around a certain frequency or across a certain power range across all frequencies). For instance, thermal noise may fluctuate between −80 and −90 dBs across a bandwidth of 20 MHz. In some examples, a modem of the UE may be able to mitigate constant or relatively constant thermal noise. However, at some frequency values, (e.g., at about 3 MHz, at about 7 MHz, etc.), the UE may experience a spike in power. Such a spike may be represented as a complex exponential (e.g., a sine wave) with a specific frequency. Such a spike may be very narrow (e.g., spur 205), may occur at a specific frequency value (e.g., at 11 Mhz within a 20 MHz span) and may not span many frequency resources.

A spur (e.g., spur 205, which may be an un-modulated CW spur) may be generated as a result of intermodulation between different oscillators of a radio frequency (RF) frontend of the UE. They may fall (e.g., may be located) at any location inside an allocated bandwidth. Spurs may be strong enough to cause sever performance degradations, especially for high MCS allocations. It may therefore be beneficial for the UE to remove (e.g., notch out) identified spurs 205. Upon spur identification, a UE may perform spur mitigation. Spur mitigation mechanisms may be performed in the time domain by applying spur notching, or may be performed in the FD by manipulating tones on which the spur 205 is found.

In some examples, a UE may mitigate or remove spurs 205 via a characterization scheme. For instance, the UE may perform offline measurements (e.g., in a laboratory environment), and may use the measurements to build a spur database. The spur database may identify the location, dimensions, or parameters, of one or more spurs 205 (e.g., under conditions of a laboratory environment). The UE may use the spur database during operational flows to identify spurs 205 and then try to cancel them (e.g., ignore them during demodulation and decoding of signaling). For example, the spur database may contain spur locations and spur levels for each spur 205 identified under the laboratory conditions. However, some spurs 205 listed in a spur database may not be observed at some devices, and some devices may experience spurs 205 that are not identified in the spur database. This may occur at a UE, for example, because operational conditions, use cases, or the like, may not be the same as conditions in the laboratory environments. Additionally, or alternatively, spurs 205 may have dynamic natures, and may be strongly affected by conditions such as electromagnetic capability (EMC) effects. Thus, a level or location or both for a given spur 205 may change over time and may be different for different UEs or different use cases of the same UE. Because spurs 205 occur at different locations or levels than spurs in a spur database under real-time or real-world conditions, spurs 205 may still occur.

Because a power at a spur 205 is significantly higher than normal or average channel noise, a spur 205 may cause decoding degradation of data signals or control signals. For example, a UE determines an average channel noise occurring across an allocated bandwidth. The high channel noise experienced at a spur 205 may impact such a determined channel noise such that the UE assumes a channel noise for decoding wireless signaling that is much higher than the channel noise experienced at many or most tones within an allocated bandwidth. Because of the inaccurate channel noise assumed by the UE, the UE may fail to accurately decode some wireless signaling, resulting in failed wireless communications, retransmissions, unnecessary utilization of available channel resources, increased delays, decreased reliability of communications, and decreased user experience.

In some examples (e.g., in a multi-radio access technology (RAT) concurrency scenario), spurs 205 may change frequency location and complex amplitude (e.g., in fast frequency hopping). In such cases, a notch filter may be re-started, and may take time to converge on a new value. Receiver gain changes may also change spur amplitude of a spur 205. Thus, characteristic-based techniques for identifying spurs, time-domain based techniques for mitigating identified spurs, or a combination thereof, may not effectively address the negative impacts of spurs 205 that occur in real time during operations at a UE.

Techniques described herein may support identification of spurs 205 during operational flows, and application of cancellation techniques once a spur 205 is detected. Because location and amplitudes of spurs 205 may be dynamic over time, the UE may dynamically identify and mitigate (e.g., in the FD) spurs 205. Techniques described herein may utilize reference signals (e.g., DMRSs) that are transmitted from time-to-time by a base station 105 (e.g., an eNB or a gNB). For instance, the base station may transmit DMRSs together with a PDSCH (e.g., which may be used to perform channel estimation of a received signal). Spur mitigation may be performed upon identified spurs 205 in the FD by removing detected spurs 205 from a DMRS symbol. In some examples, the spur mitigation may be performed upon identified spurs 205 in the FD by adjusting noise whitening for data tones on which the spur falls. Such techniques are described in greater detail with reference to FIG. 3.

Figure 3:
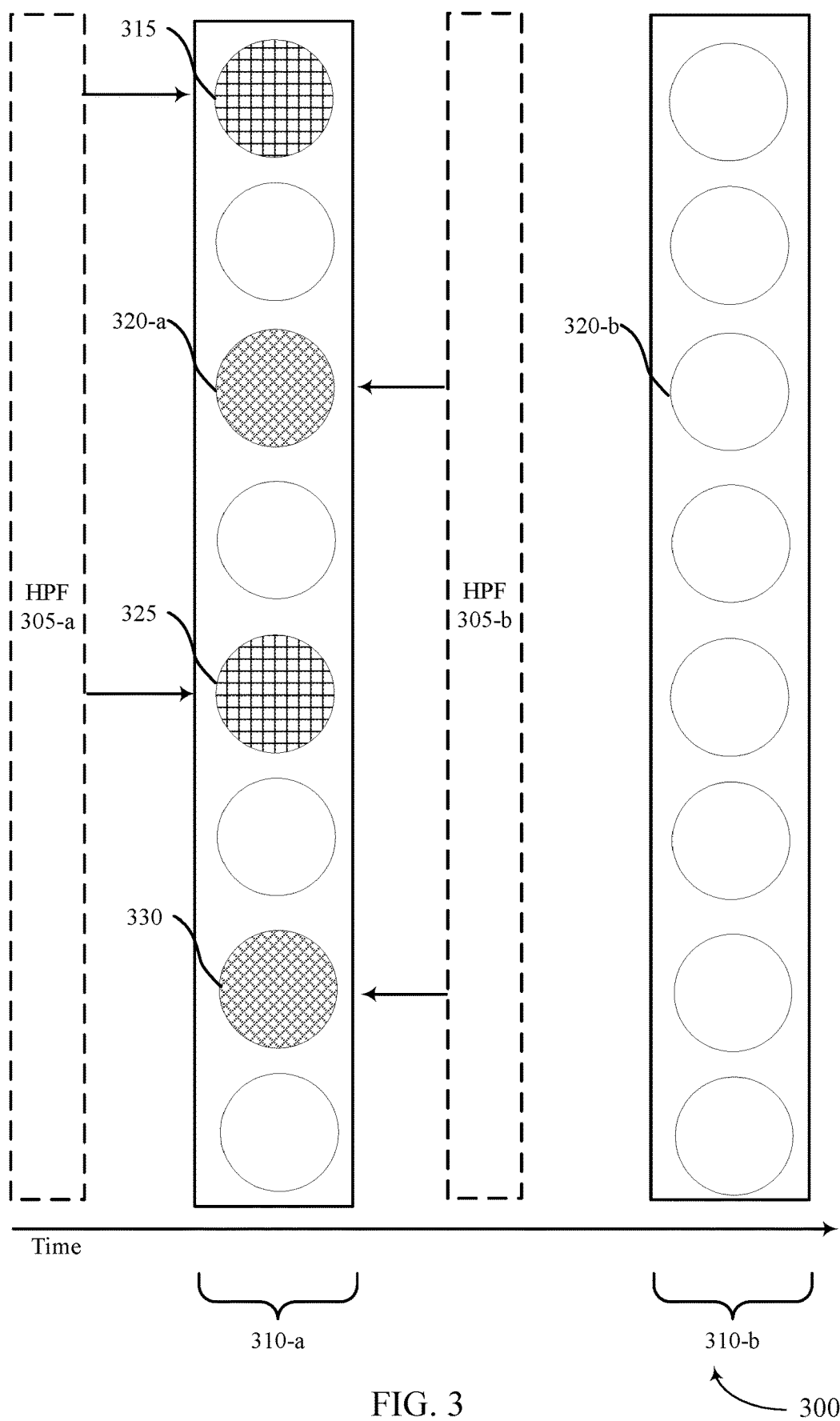
FIG. 3 illustrates an example of a timeline that supports online spur detection and mitigation in accordance with aspects of the present disclosure.

FIG. 3 illustrates an example of a timeline 300 that supports online spur detection and mitigation in accordance with aspects of the present disclosure. Timeline 300 may implement aspects of, or be implemented by aspects of, wireless communications system 100. For example, a UE (e.g., a UE 115) that may perform aspects of timeline 300 may be an example of corresponding devices described with reference to FIGS. 1 and 2. Such a UE may perform a spur reduction procedure, as described below.

In some examples, a UE may perform spur detection by applying on or more high pass filters (HPFs 305) to one or more frequency tones over one or more transmission time intervals (TTIs) (e.g., symbols 310). The UE may monitor multiple tones (e.g., pilot tone 315, pilot tone 320-a, pilot tone 325, pilot tone 330, etc.) of a first symbol period (e.g., symbol 310-a) to identify a noise spur at a first reference signal tone (e.g., pilot tone 320-a). A UE may perform filtering (e.g., may apply an HPF 305) across one or more tones to determine if a change in channel noise for a specific tone compared to one or more neighbor tones exceeds a threshold. For instance, the UE may determine an average or normalized channel noise (e.g., for all tones in an allocated bandwidth, or for a specific subset of tones, or for a particular tone and one or more neighbor tones for the particular tone). The UE may detect spurs by detecting a significant change in estimated channel or noise between neighbor tones (e.g., based on an assumption that an actual channel changes that are not resulting from spurs will occur slowly between tones).

The UE may measure channel noise for tone 320-a during symbol 310-a. By implementing techniques described herein the UE may determine that a spur occurs at tone 320-a. Tones during symbol 310-a may be allocated for different communication types. For instance, tones 315, 320, 325, and 330, may be allocated as pilot tones (e.g., for reference signals such as DMRSs). Other tones during symbol 310-a may be allocated as non-pilot tones (e.g., may be empty tones or may be data tones). The UE may measure channel noise for tone 320-a, and may compare the channel noise to channel noise measured for one or more neighbor tones. In some examples, neighbor tones may include any pilot tone (e.g., pilot tone 315 and pilot tone 325). In some examples, neighbor tones may include pilot tones that share one or more parameters with a measured pilot tone. For instance, the neighbor pilot tones may have a same port comb, a same tone comb type, or the like. In some examples, the UE may apply a HPF 305 on signals which consist of descrambled tones of the same type (e.g., having the same port combination, the same orthogonal cover code (OCC) set, or the like).

The UE may apply a HPF 305 to pilot tones that have the same parameters. For example, pilot tone 315 and pilot tone 325 may have an OCC of (+1,+1), while pilot tone 320 and pilot tone 330 may have an OCC of (+1, −1). In such examples, the UE may apply HPF 305-a to a first subset of pilot tones (e.g., including pilot tone 315 and pilot tone 325), may apply a second HPF 305-b to a second subset of pilot tones (e.g., including pilot tone 320-a and pilot tone 330), or a combination thereof. HPF examples may include applying the HPF 305 to non-corner tones (e.g., [−0.5, 1, −0.5]) or corner tones (e.g., [1−0.5 −0.5]/[−0.5 −0.5 1], or the like).

The UE may identify spurs by applying one or more HPF 305. Applying the HPF 305 may enable the UE to determine if particular pilot tone is experiencing a large change in channel noise (e.g., exceeding a threshold) when compared to one or more neighbor tones. For instance, the UE may generate a channel estimate corresponding to the first reference signal tone (e.g., the pilot tone 320-a) based at least in part on performing a spur reduction procedure on the first reference signal tone. In some examples, applying HPFs 305 as described herein may enable the UE to determine a predicted channel noise for a particular tone based on a measured channel noise for one or more neighbor tones (e.g., at least one neighbor tone that has a higher frequency value than the measured tone and at least one neighbor tone that has a lower frequency value than the measured tone). For instance, the UE may estimate a first channel noise level for at least a second reference signal tone of multiple reference signal tones (e.g., may estimate a channel noise level for one or more neighboring pilot tones, such as pilot tone 330), the UE may detect a second channel noise level for the first reference signal tone (e.g., the pilot tone 320-*a*), and the UE may identify the noise spur at the pilot tone 320-*a* based at least in part on the first channel noise level and the second channel noise level. If a UE detects a channel noise that exceeds such a predicted channel noise (e.g., a channel noise for a particular tone such as tone 320-*a* exceeds a measured channel noise for one or more neighbor tones) by a threshold amount, then the UE may accurately determine, in real time, that a spur 205 exists for that particular tone.

In some examples, the UE may determine an average channel noise across an entire allocated bandwidth. The UE may also determine an average noise across one or more neighbor tones, which may be compared with the overall average channel noise. Based on such comparisons, the UE may identify one or more tone maximum values (e.g., tones having a maximum channel noise in comparison with neighbor tones). The UE may compare the tones having the highest channel noise with reference to the average channel noise and/or measured neighbor tones to a threshold value. If the channel noise for the identified tone, or a difference between the channel noise for the identified tone and the channel noise of the neighbor tones, has a value that exceeds the threshold value, then the UE may determine that a spur exists on that tone.

Figure 4:
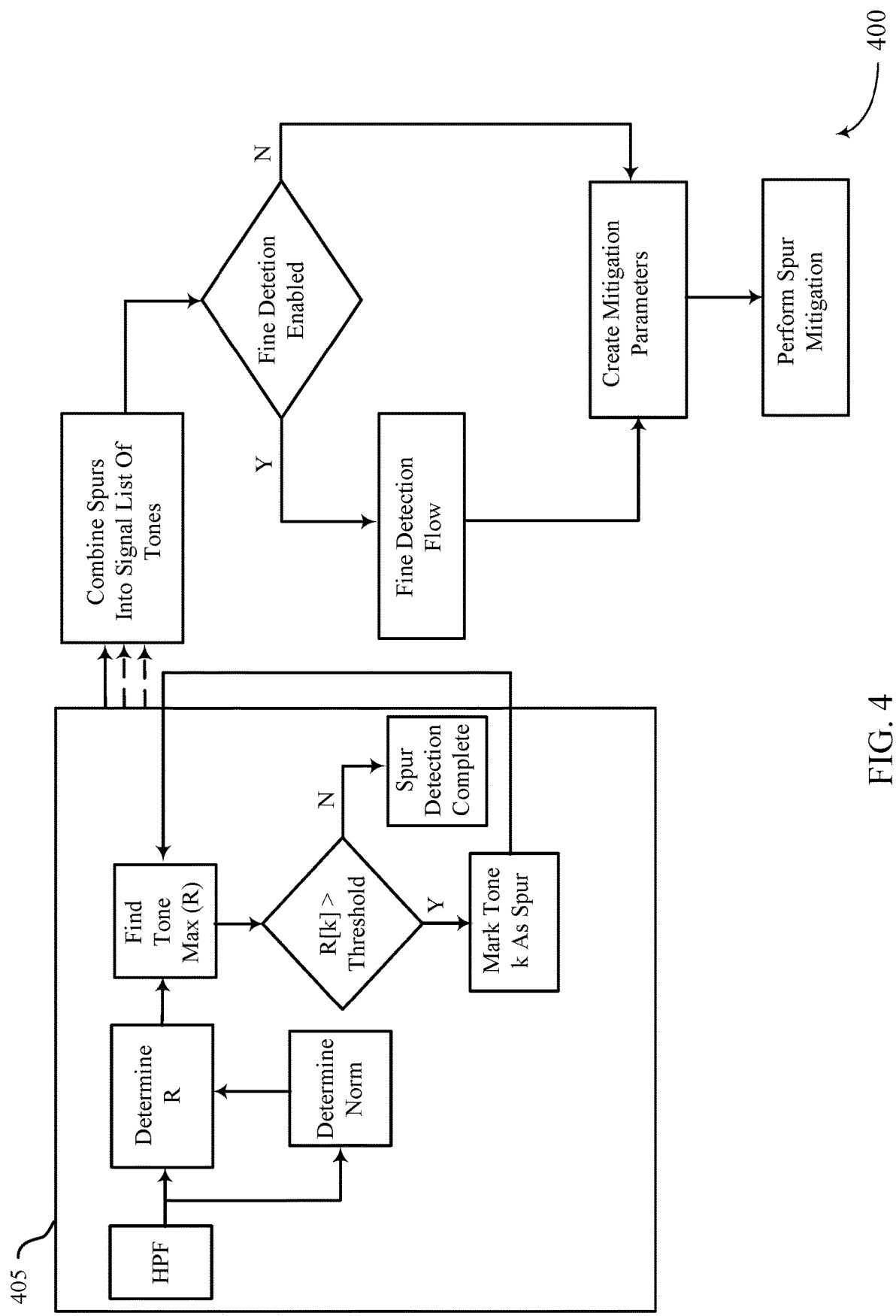
FIG. 4 illustrates an example of a flow diagram that supports online spur detection and mitigation in accordance with aspects of the present disclosure.
Figure 5:
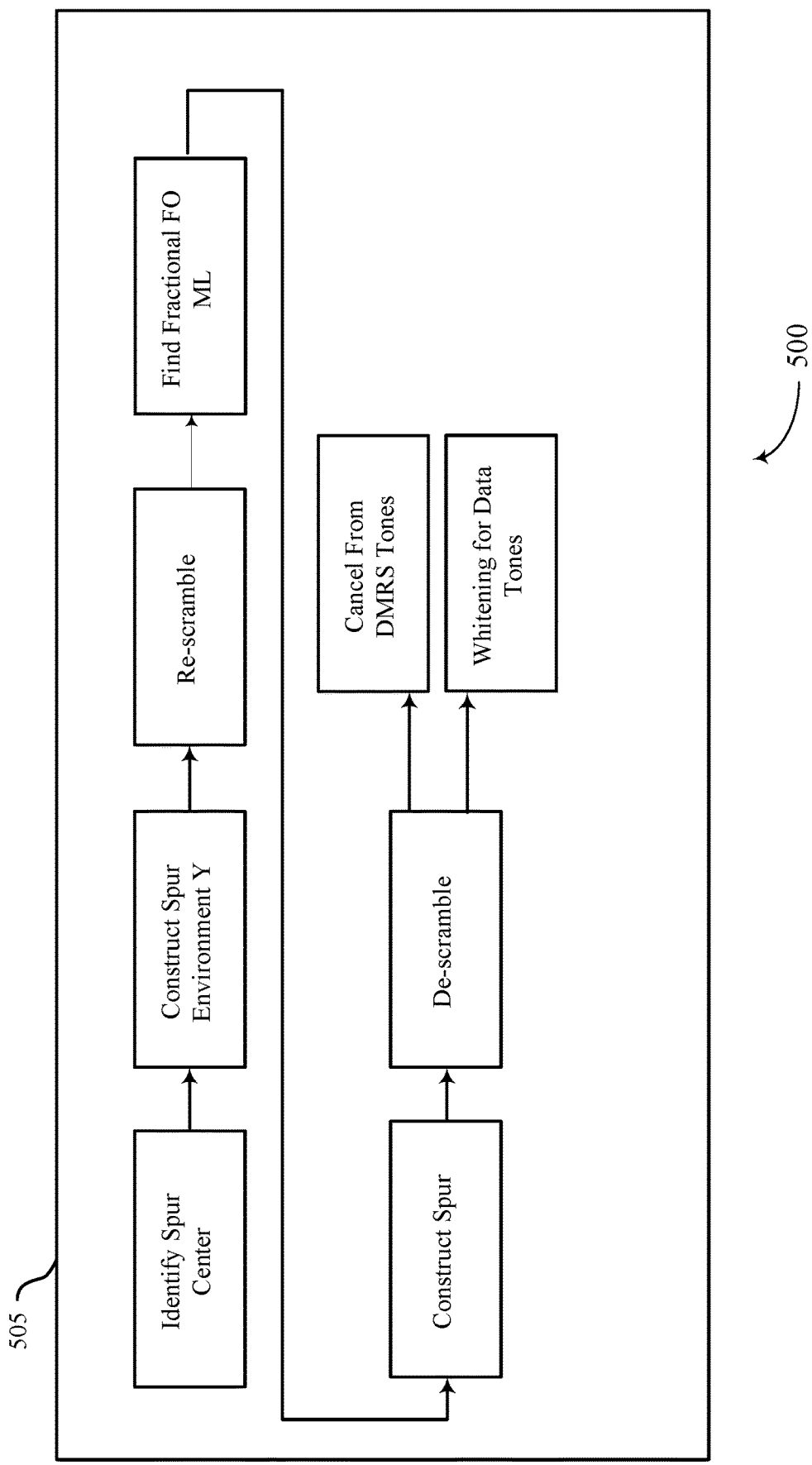
FIG. 5 illustrates an example of a flow diagram that supports online spur detection and mitigation in accordance with aspects of the present disclosure.
Figure 6:
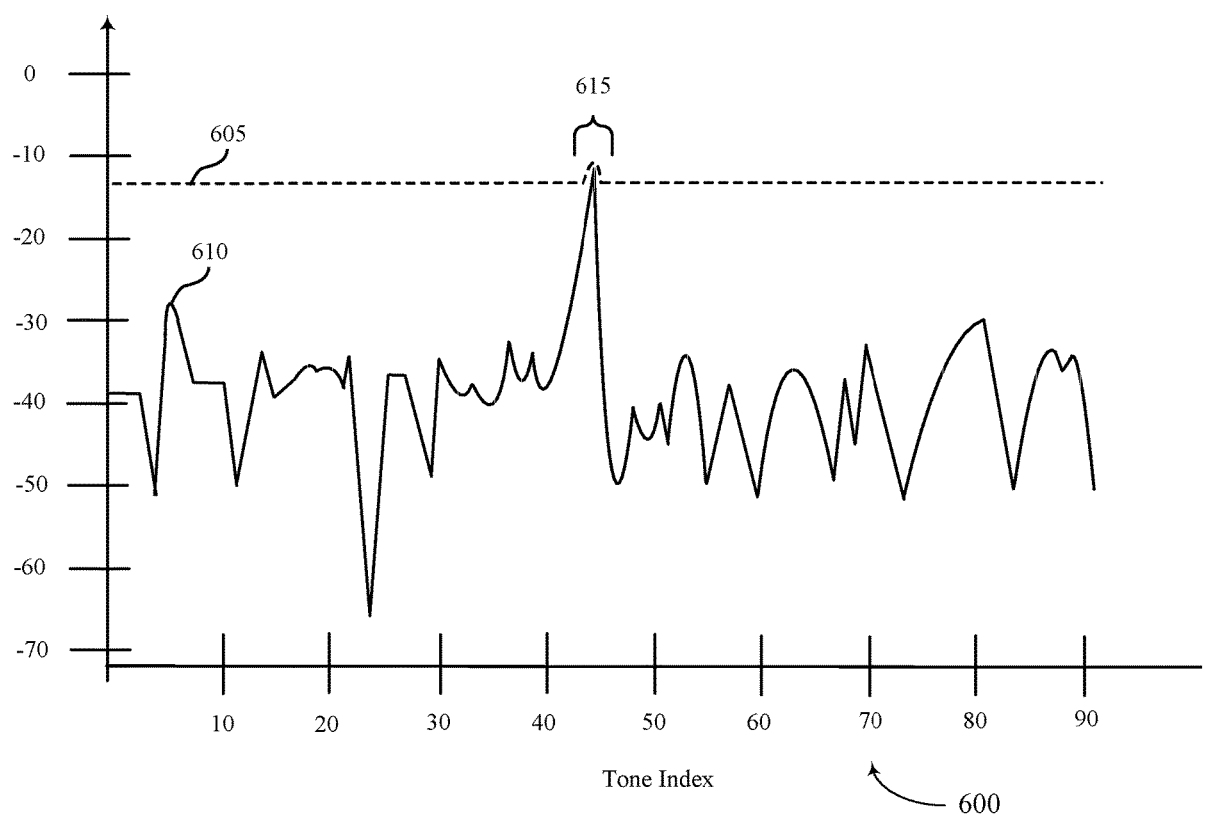
FIG. 6 illustrates an example of a spur detection scheme that supports online spur detection and mitigation in accordance with aspects of the present disclosure.

Such HPF techniques are further described in with reference to FIGS. 4-6. Upon identifying spurs, the UE may perform spur mitigation techniques, as described in greater detail with reference to FIGS. 4-7. In some examples, the UE may perform noise equalization on at least a second tone (e.g., tone 320-*b*, which may share the same frequency resources as the pilot tone 320-*a*, but may be a non-pilot tone such as a data tone) of a second symbol period (e.g., symbol period 310-*b*). The UE may then demodulate the second tone (e.g., tone 320-*b*) based at least in part on the noise equalization and the channel state. For example, upon identifying one or more spurs, the UE may zero the identified tone on which the spur exists, and one or more neighboring tones (e.g., the tones immediately adjacent to the tone in the FD). Additionally, or alternatively, the UE may generate parameters for noise whitening in a subsequent TTI (e.g., symbol 310-*b*). For instance, the UE may identify a spur that occurs at tone 320-*a* (e.g., which may be a pilot tone on which the UE receives DMRS). The UE may determine (e.g., may estimate or may otherwise assume) that the spur does or may exist at least partially on one or more tones immediately higher or lower than the tone 320-*a* (e.g., the non-pilot tone between pilot tone 315 and pilot tone 325), and may mitigate the spur accordingly, as described with reference to FIGS. 4-7.

The UE may mitigate the spur over time. The spur may impact the frequency resources of pilot tone 320-*a* during multiple symbols 310. In some examples, the tone 320-*b* of symbol 310-*b* may not be a pilot tone (e.g., may be a data tone). Thus, if the UE mitigates the spur at tone 320-*a* during symbol 310-*a* but does not mitigate the spur for one or more subsequent symbols 310, then the UE may not be able to successfully receive data signaling on the tone 320-*b* during symbol 310-*b* (e.g., because of the excessive channel noise resulting from the spur detected at tone 320-*a*, poor channel estimation based on the excessive channel noise resulting from the spur detected at tone 320-*a*, etc.). Thus, the UE may mitigate the spur over time. For instance, the UE may generate one or more noise whitening parameters to mitigate (e.g., cancel out) the spur during subsequent symbols 310-*b*.

The UE may dynamically (e.g., during each pilot symbols that includes one or more pilot tones) perform the spur detection techniques described herein, to adjust noise whitening parameters or spur cancellation techniques in real-time, such that spurs that occur at different times and frequency resources, can be effectively and efficiently identified, and mitigated. For example, if noise whitening parameters generated for a previous spur are no longer necessary (e.g., the UE determines that the spur does not exist any longer at an identified tone), then the UE may stop applying or may update noise whitening parameters for that tone. If the UE determines that the parameters for a spur have changed (e.g., a tone or a noise level for that tone) based on applying the HPFs 305 as described herein, then the UE may update its noise whitening parameters accordingly. If the UE determines that a new spur has appeared at a newly identified tone based on the HPFs 305, then the UE may generate new noise whitening parameters, as described herein with reference to FIGS. 4-7.

In some examples, a UE may perform spur mitigation to minimize or eliminate the effects of an identified spur. For example, a UE may detect the spur on pilot tones (e.g., but may not be able to estimate the spur completely). In such examples, the UE may perform a channel estimation procedure to the first reference signal tone (e.g., the pilot tone 320-*a*) based at least in part on a spur reduction procedure as described herein (e.g., may remove the spur from a channel estimate for DMRS tones), may adjust the channel estimate by adding a spur noise estimate determined by the spur reduction procedure back to the clean channel, and may reduce the noise for a second tone (e.g., the non-pilot tone 320-*b*) of a second symbol (e.g., symbol 310-*b*) by applying the noise equalization parameter using one or more noise whitening parameters corresponding to the adjusted channel.

For example, the UE may perform spur cancellation on the pilot tones using an estimator, where spur=$H_{filter}[k]$ assuming that the spur detection occurs for a tone k. In such examples, $H_{noisy}[k]=H_{noisy}[k]$−spur, and where $H_{filter}$ may refer to a filter, such as a HPF, $H_{noisy}[k]$ may refer to a channel noise for a tone on which a spur is detected. The UE may perform whitening on the data tones for neighbor symbols (e.g., may detect the spur on pilot tone 320-*a* in symbol 310-*a*, and may perform whitening on data tone 320-*b* in symbol 310-*b*), assuming that the spur exists also on the neighbor symbols. Whitening may be designed assuming a worst case spur spreading sinc function. For example, a spur model may be defined as: $spur_{model}[k+(-L:L)]=abs(spur[k]) \cdot sinc(0.5+(-L:L))$ where L represents a value in time or frequency for a tone k. A spur coefficient of variation $spur_{cov}[k]$ may be defined as $spur_{cov}[k]=cov(spur_{model[k]})$. A total channel estimation $R_{nn_{total}}[k]$ may be defined based on a channel noise for a tone $R_{nn}[k]$ such that $R_{nn_{total}[k]}=R_{nn}[k]+spur_{cov[k]}$. A total channel estimation as adjusted by whitening parameters $U_{nn_{total}[k]}$ (e.g., a whitening matrix) may be defined as $U_{nn_{total}[k]}=Cholesky(R^{nn}_{total})$−whitening matrix. A UE may determine a whitening matrix for an identified spur, and may apply the whitening matrix to neighboring data tones to mitigate the identified spur, as described in greater detail with reference to FIG. 7.

In some examples, the UE may be able to estimate a spur completely. The UE may perform a channel estimation procedure to the first reference signal tone (e.g., the pilot tone 320-*a*) to determine a first channel estimate, may adjust the channel estimate by removing a spur noise estimate determined by a spur reduction procedure as described herein for the noise spur to generate the channel estimate corresponding to the first reference signal tone. In some examples, the UE may perform a noise equalization procedure on a second tone (e.g., the non-pilot tone 320-b) of a second symbol (e.g., symbol 310-b) by considering one or more parameters, or using one or more noise whitening parameters corresponding to the noise spur estimate, or a combination thereof. For instance, the UE may calculate the spur estimation on data tones (e.g., the non-pilot tone 320-b) by considering one or more parameters. For example, the UE may consider a spur frac frequency offset, a spur complex amplitude, a symbol duration, a cyclic prefix (CP) duration, or the like. The UE may then cancel the spur from both the pilot tones (e.g., the pilot tone 320-a) and the data tones (e.g., a data tone such as tone 320-b).

By implementing techniques described herein, the UE may identify spurs that are much lower than a signal power per tone (PSD) (e.g., −15 dBc). The UE may identify spurs in the FD as significant changes to channel or noise in the neighbor tones. The UE may generate or suggest spur whitening or cancelation in the FD based on the estimated spur signal component.

FIG. 4 illustrates an example of a flow diagram 400 that supports online spur detection and mitigation in accordance with aspects of the present disclosure. Flow diagram 400 may be implement by, or may implement aspects of, wireless communications system 100. For example, a UE (e.g., a UE 115) may be an example of corresponding devices described with reference to FIGS. 1-3, and may perform aspects of flow diagram 400.

A UE may perform course detection flow 405 and other aspects of flow diagram 400 to identify and mitigate spurs, as described herein. For example, the UE may apply a HPF to one or more tones (e.g., tones having one or more of the same parameters, such as a same port comb, a same tone comb type, a same frequency comb, or any combination thereof). For instance, the UE may apply a HPF to tones having the same OCC settings. The UE may then determine a normalization for the resulting average values (e.g., to non-corner tones). The UE may normalize estimated channel noise over at least tones to which the HPF is applied (e.g., one or more neighbor tones having the same parameter values). The UE may determine a normalized channel noise such that Norm=mean($|Y|^2$). The UE may determine a channel noise ratio metric R for a tone such that R=($|Y|^2$/Norm. The UE may find a highest channel noise for a tone k (e.g., max (R). The UE may compare the max channel noise values for one or more tones k to a threshold (e.g., determine whether R[k]>threshold). If R[k]>threshold, then the UE may identify the tone k as a tone in which a spur exists. In some examples, to mitigate the effects of the spur, the UE may zero the R for one or more tones k (e.g., for tones=[k−1, k+1]. In such examples, the UE may continue to find max (R) for additional tones k. If the UE determines that R[k] is not greater than threshold, then the UE may complete its spur detection (e.g., for a particular tone k). The UE may perform multiple iterations of coarse detection flow 405 (e.g., across each tone k of a set of tones that have the same parameters within an allocated bandwidth). Upon performing the multiple iterations, the UE may generate a set of tones one which spurs have been identified.

The UE may combine the spurs into a single list of tones. If fine detection is not enabled, then the UE may create mitigation parameters for performing spur mitigation based on coarse detection flow 405. If fine detection is enabled at the UE, then the UE may perform fine detection as described in greater detail with reference to FIG. 5. Based on the fine detection flow, the UE may create mitigation parameters for performing spur mitigation.

FIG. 5 illustrates an example of a flow diagram 500 that supports online spur detection and mitigation in accordance with aspects of the present disclosure. Flow diagram 500 may be implemented by, or implement aspects of, wireless communications system 100. For example, a wireless device (e.g., a UE) may be an example of corresponding devices described with reference to FIGS. 1-5.

A UE may perform fine detection flow 505. For example, the UE may identify one or more tones on which a spur is located (e.g., via coarse detection flow 405 as described with reference to FIG. 4). The UE may then perform fine detection flow 505. The UE may identify the spur center (e.g., the center of a spur 205 as described with reference to FIG. 2). The UE may construct a spur environment Y, and may re-scramble the tone. The UE may find a fractional large signal figure of merit (FOML). The UE may construct the spur, and de-scramble the tone. The UE may then cancel the spur from the DMRS tones, perform whitening for data tones, or both.

FIG. 6 illustrates an example of a spur detection scheme 600 that supports online spur detection and mitigation in accordance with aspects of the present disclosure. Spur detection scheme 600 may implement aspects of or be implemented by aspects of wireless communications system 100. For example, a UE may be an example of corresponding devices described with reference to FIGS. 1-5, and may perform aspects of spur detection scheme 600.

In some examples, a UE may detect a spur as described with reference to FIGS. 1-5. The UE may identify a real-time channel noise 610 by applying one or more HPFs, which may be more accurate than an average channel noise 605 (e.g., across one or more DMS tones). An average channel noise 605 may not vary substantially across multiple tones. Even a spur 615 may not be easily detected if a UE attempts to identify spurs 615 based on average channel noise. For example, the spur 615 may not significantly exceed average channel noise 605. However, by applying a HPF, the UE may detect rapid changes to channel condition over various tones. Rapid changes that do not exceed the threshold value may pass through the HPF. Changes that do exceed the threshold (e.g., at spur 615) may be detected by the HPF, allowing the UE to accurately detect the spur 615.

Detection performance may be limited to variations of thermal noise and a channel. Assuming that channel noise based on Gaussian statistics, the UE may perform spur detection schemes such according to conditions for reliable detection. Conditions may include $\text{spur}_{pwr}>\text{var(noise)}+10$, where $\text{spur}_{pwr}$ represents a power level of a spur 615, and var(noise) represents a channel noise variance. For example, for an SNR of 27 dB, $\text{spur}_{pwr}>\text{tone}_{pwr}-17$.

Figure 7:
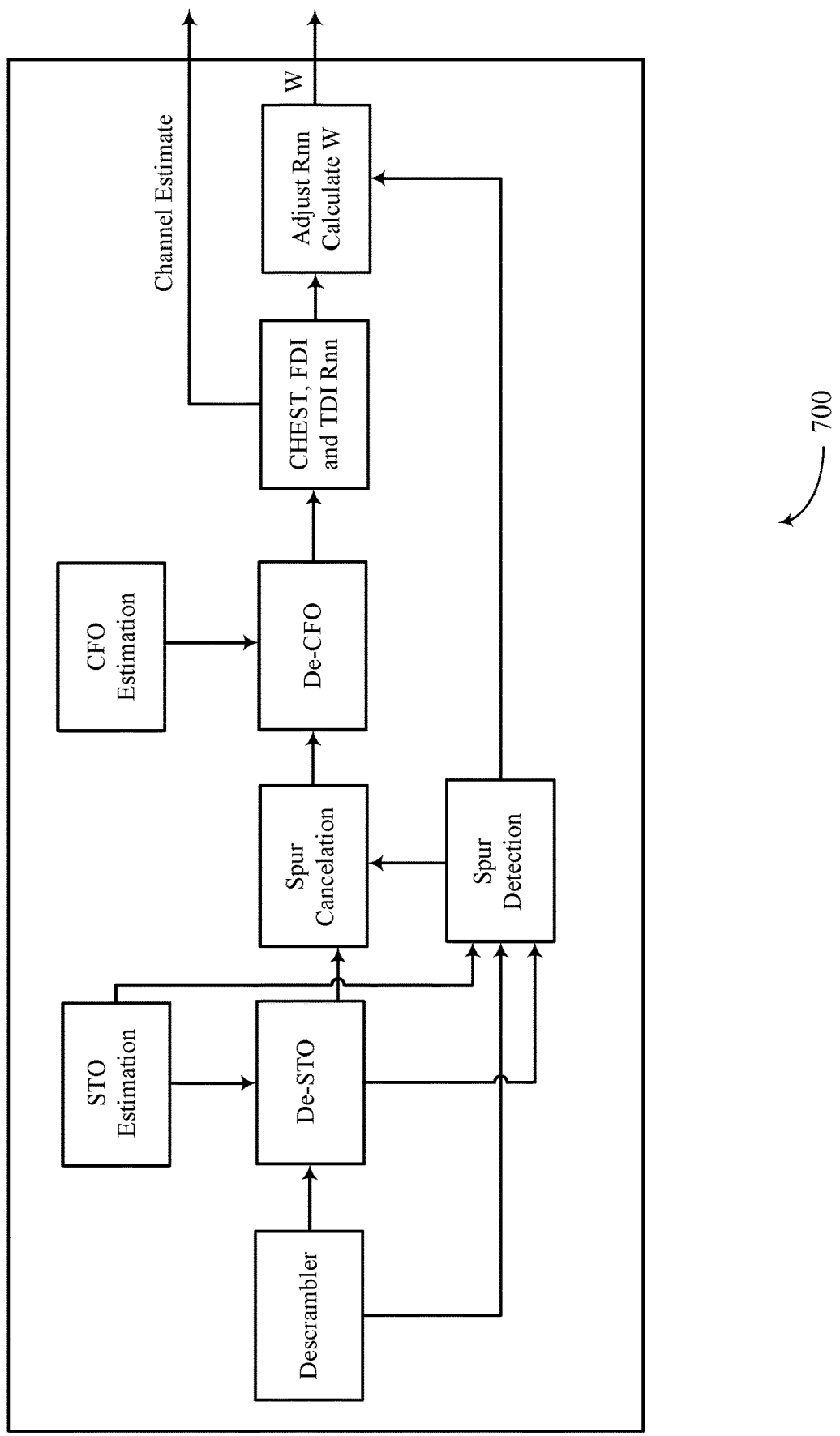
FIG. 7 illustrates an example of a flow diagram that supports online spur detection and mitigation in accordance with aspects of the present disclosure.

FIG. 7 illustrates an example of a flow diagram 700 that supports online spur detection and mitigation in accordance with aspects of the present disclosure. Flow diagram 700 may implement aspects of, or may be implemented by aspects of, wireless communications system 100. For example, a UE (e.g., a UE 115) may be an example of corresponding devices described with reference to FIGS. 1-6, and may perform aspects of flow diagram 700.

A UE may receive wireless signaling during one or more DMRS symbols. The UE may descramble one or more DMRS tones, and may perform symbol timing offset (STO) estimation and de-STO for the DMRS symbol. The UE may perform spur detection, as described with reference to FIGS. 2-6, on the descrambled symbol based on the STO estimation and the de-STO estimation. Having descrambled the DMRS symbol, STO estimation, and de-STO procedure as part of a channel estimation procedure, the UE may identify channel noise for the DMRS symbol. The UE may then perform Spur cancelation on the identified spur. Having canceled the spur, the UE may be left with a clean signal.

The UE may perform a carrier frequency offset (CFO) estimation as part of channel estimation for the DMRS symbol and a De-CFO procedure on the tone after the spur cancelation. The UE may perform channel estimation (e.g., FD interpolation (FDI), time domain interpolation (TDI), etc.) to generate a channel estimate $R_{nn}$ for the clean DMRS symbol.

The identified spur may exist at a neighbor data symbol as well. But channel estimation cleaning (e.g., by removing the Spur) may not result in easily removing the spur from one or more data symbols. Removing the spur from the data symbols may be effective and efficient, but may also rely on high thermal SNR. Alternatively, a UE may perform optimal noise whitening. In such examples, the UE may adjust the channel estimate $R_{nn}$ by adding the spur back to the channel noise. The UE may then calculate whitening parameters for performing whitening during the neighboring data symbols (e.g., on the same tone). That is, the UE may add the spur back to the channel estimate (e.g., to take into account the clean channel noise plus the spur), and may generate parameter values to equalize the channel noise during neighboring symbols on the same tone, or on a few tones with higher frequency and a few tones with lower frequency.

Figure 8:
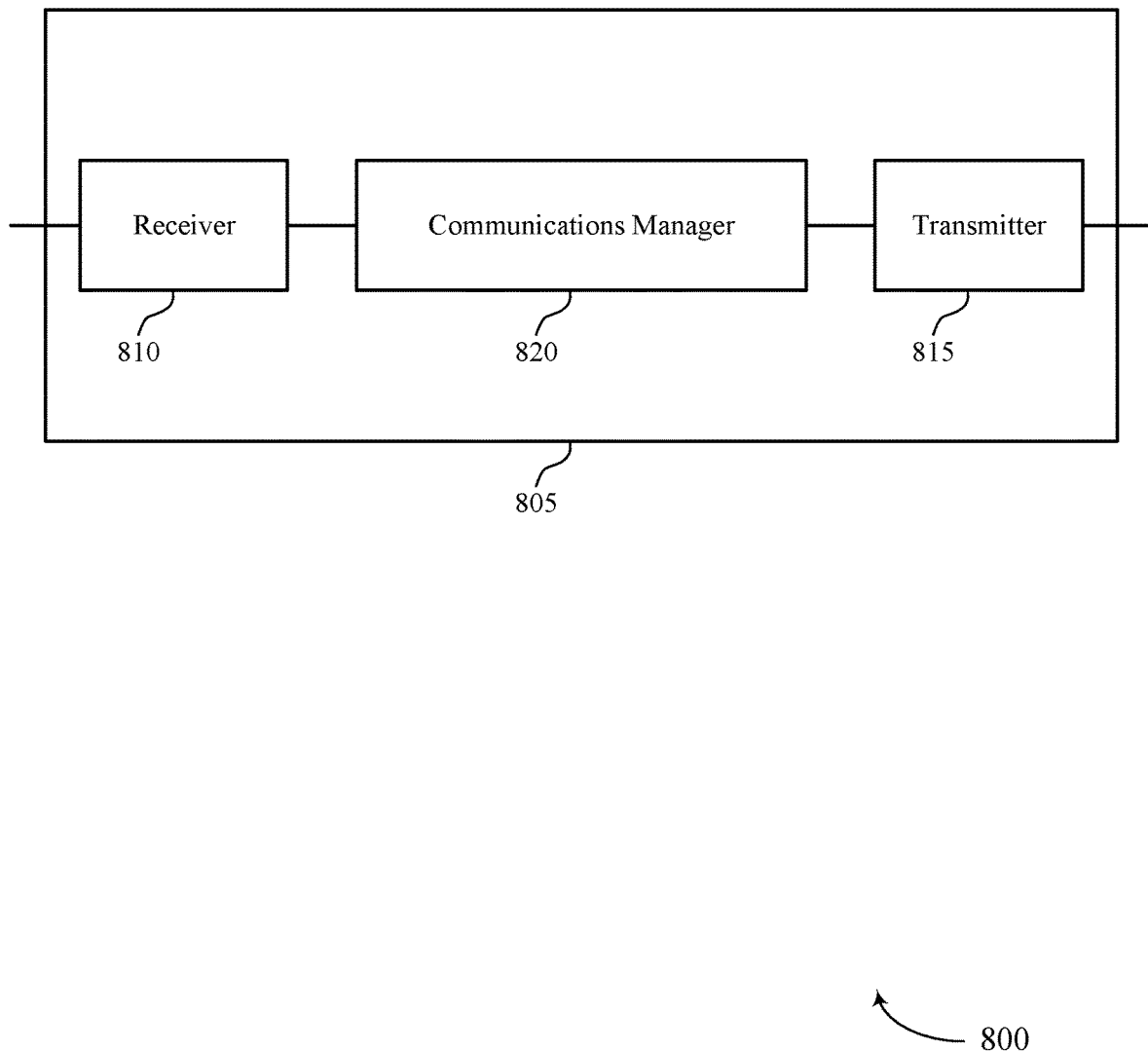
FIGS. 8 and 9 show diagrams of devices that support online spur detection and mitigation in accordance with aspects of the present disclosure.

FIG. 8 shows a diagram 800 of a device 805 that supports online spur detection and mitigation in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to online spur detection and mitigation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to online spur detection and mitigation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of online spur detection and mitigation as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for monitoring a set of multiple reference signal tones of a first symbol period to identify a noise spur at a first reference signal tone of the set of multiple reference signal tones. The communications manager 820 may be configured as or otherwise support a means for generating a channel estimate corresponding to the first reference signal tone based on performing a spur reduction procedure on the first reference signal tone. The communications manager 820 may be configured as or otherwise support a means for performing noise equalization on at least a second tone, of a second symbol period, adjacent to the first reference signal tone. The communications manager 820 may be configured as or otherwise support a means for demodulating the second tone based on the noise equalization and the channel estimate.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for spur detection and mitigation, which may result in improved channel estimation, more efficient wireless communications, improved accuracy of channel decoding, decreased system latency, improved reliability of wireless communications, and improved user experience.

Figure 9:
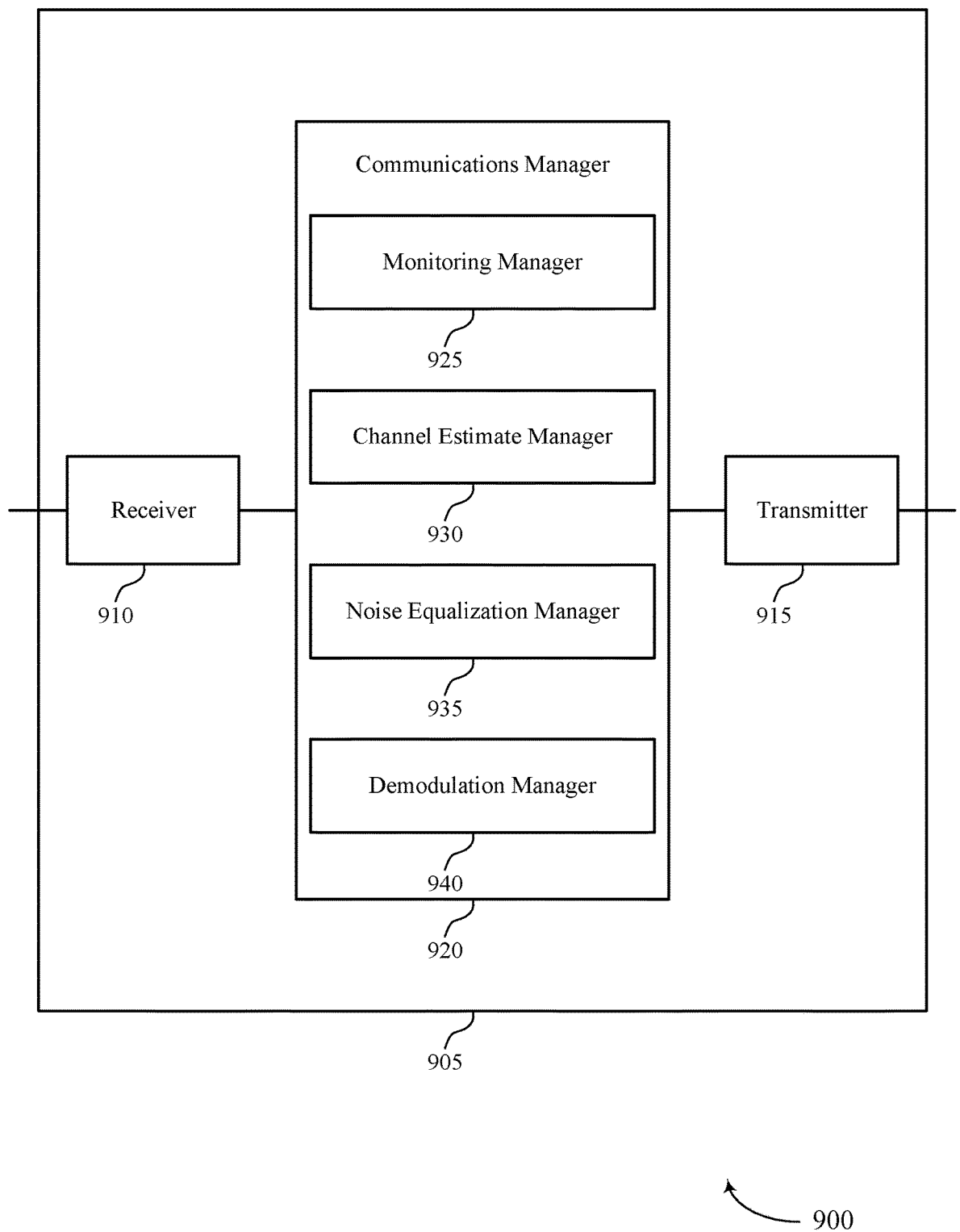

FIG. 9 shows a diagram 900 of a device 905 that supports online spur detection and mitigation in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to online spur detection and mitigation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to online spur detection and mitigation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of online spur detection and mitigation as described herein. For example, the communications manager 920 may include a monitoring manager 925, a channel estimate manager 930, a noise equalization manager 935, a demodulation manager 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The monitoring manager 925 may be configured as or otherwise support a means for monitoring a set of multiple reference signal tones of a first symbol period to identify a noise spur at a first reference signal tone of the set of multiple reference signal tones. The channel estimate manager 930 may be configured as or otherwise support a means for generating a channel estimate corresponding to the first reference signal tone based on performing a spur reduction procedure on the first reference signal tone. The noise equalization manager 935 may be configured as or otherwise support a means for performing noise equalization on at least a second tone, of a second symbol period, adjacent to the first reference signal tone. The demodulation manager 940 may be configured as or otherwise support a means for demodulating the second tone based on the noise equalization and the channel estimate.

Figure 10:
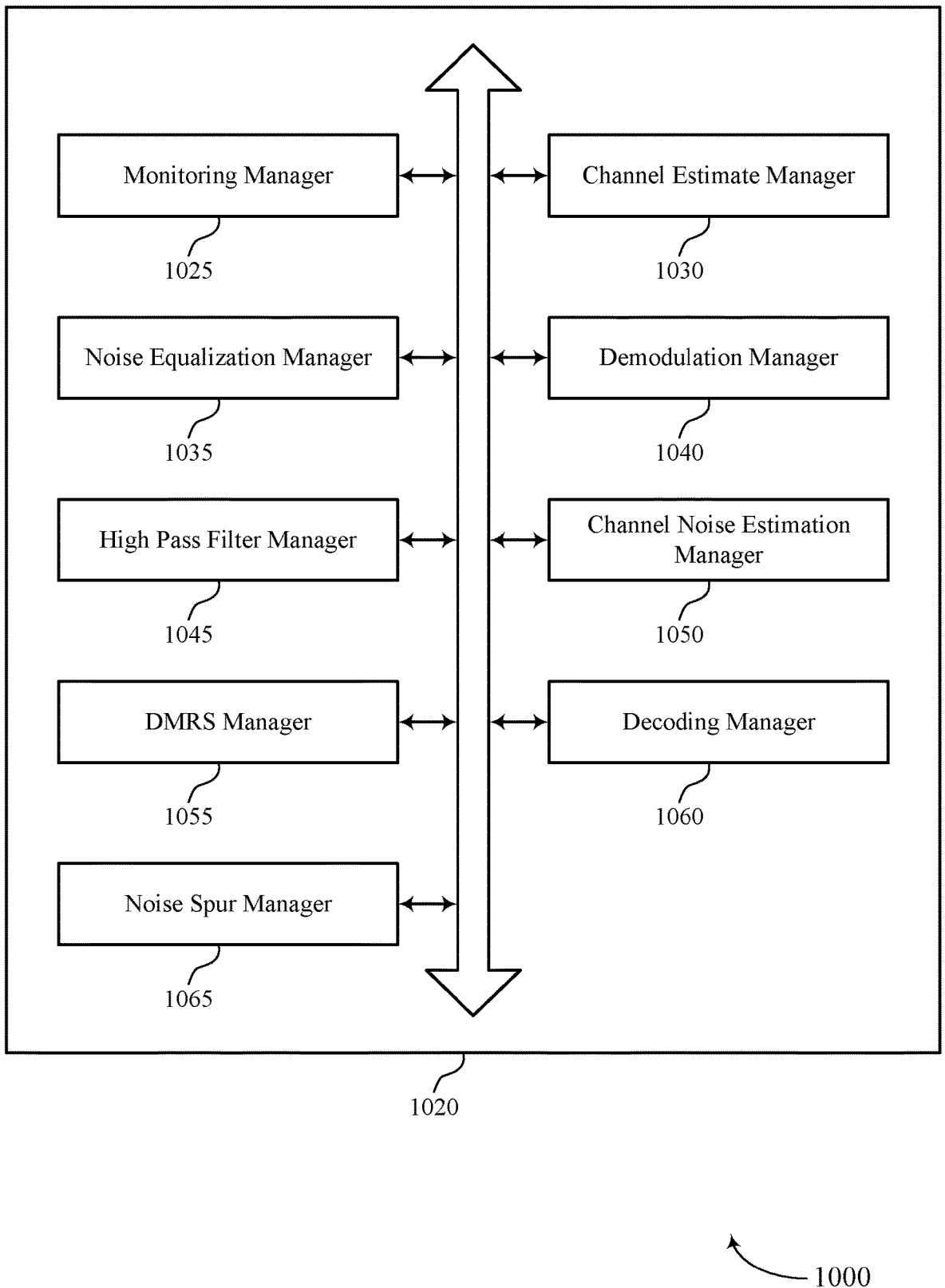
FIG. 10 shows a diagram of a communications manager that supports online spur detection and mitigation in accordance with aspects of the present disclosure.

FIG. 10 shows a diagram 1000 of a communications manager 1020 that supports online spur detection and mitigation in accordance with aspects of the present disclosure. The communications manager 1020 may be an example of aspects of a communications manager 820, a communications manager 920, or both, as described herein. The communications manager 1020, or various components thereof, may be an example of means for performing various aspects of online spur detection and mitigation as described herein. For example, the communications manager 1020 may include a monitoring manager 1025, a channel estimate manager 1030, a noise equalization manager 1035, a demodulation manager 1040, a high pass filter manager 1045, a channel noise estimation manager 1050, a DMRS manager 1055, a decoding manager 1060, a noise spur manager 1065, or any combination thereof. Each of these components may communicate, directly or indirectly, with one another (e.g., via one or more buses).

The communications manager 1020 may support wireless communications at a UE in accordance with examples as disclosed herein. The monitoring manager 1025 may be configured as or otherwise support a means for monitoring a set of multiple reference signal tones of a first symbol period to identify a noise spur at a first reference signal tone of the set of multiple reference signal tones. The channel estimate manager 1030 may be configured as or otherwise support a means for generating a channel estimate corresponding to the first reference signal tone based on performing a spur reduction procedure on the first reference signal tone. The noise equalization manager 1035 may be configured as or otherwise support a means for performing noise equalization on at least a second tone, of a second symbol period, adjacent to the first reference signal tone. The demodulation manager 1040 may be configured as or otherwise support a means for demodulating the second tone based on the noise equalization and the channel estimate.

In some examples, the high pass filter manager 1045 may be configured as or otherwise support a means for applying a high pass filter to the set of multiple reference signal tones based on the monitoring, where identifying the noise spur is based on applying the high pass filter.

In some examples, the channel noise estimation manager 1050 may be configured as or otherwise support a means for estimating a first channel noise level for at least a second reference signal tone of the set of multiple reference signal tones. In some examples, the channel noise estimation manager 1050 may be configured as or otherwise support a means for detecting a second channel noise level for the first reference signal tone. In some examples, the noise spur manager 1065 may be configured as or otherwise support a means for identifying the noise spur at the first reference signal tone based on the first channel noise level and the second channel noise level.

In some examples, the high pass filter manager 1045 may be configured as or otherwise support a means for determining to apply the high pass filter based on the first channel noise level differing from the second channel noise level by at least a threshold amount. In some examples, a signal received via the first reference signal tone, and the second reference signal tone, is communicated using a same set of one or more parameters. In some examples, the one or more parameters include a port combination, an orthogonal cover code set, a port comb, or any combination thereof.

In some examples, to support identifying the noise spur, the noise spur manager 1065 may be configured as or otherwise support a means for identifying a location of a center of the spur, where the spur reduction procedure is performed corresponding to the location of the center of the spur.

In some examples, to support performing the noise equalization, the channel estimate manager 1030 may be configured as or otherwise support a means for performing a channel estimation procedure to the first reference signal tone to determine a first channel estimate. In some examples, to support performing the noise equalization, the channel estimate manager 1030 may be configured as or otherwise support a means for adjusting the channel estimate by removing a noise spur estimate determined by the spur reduction procedure for the noise spur to generate the channel estimate corresponding to the first reference signal tone. In some examples, to support performing the noise equalization, the noise equalization manager 1035 may be configured as or otherwise support a means for performing a noise equalization procedure on the second tone of the second symbol using one or more noise whitening parameters corresponding to the noise spur estimate.

In some examples, to support performing the noise equalization, the channel noise estimation manager 1050 may be configured as or otherwise support a means for performing a channel noise estimation procedure for the first reference signal tone based on the spur reduction procedure. In some examples, to support performing the noise equalization, the channel noise estimation manager 1050 may be configured as or otherwise support a means for adjusting the channel noise estimation by adding the noise spur to the estimated channel noise of the first reference signal tone. In some examples, to support performing the noise equalization, the noise equalization manager 1035 may be configured as or otherwise support a means for reducing the noise for the second tone of the second symbol by applying the noise equalization procedure using one or more noise whitening parameters corresponding to the adjusted channel.

In some examples, the DMRS manager 1055 may be configured as or otherwise support a means for receiving a reference signal via the set of multiple reference signal tones, where the reference signal includes a demodulation reference signal.

In some examples, the demodulation manager 1040 may be configured as or otherwise support a means for receiving data on the second tone based on demodulation the second tone. In some examples, a frequency resource of the second tone is the same as a frequency resource of the first reference signal tone.

In some examples, the decoding manager 1060 may be configured as or otherwise support a means for decoding one or more bits from the second tone based on the demodulating.

Figure 11:
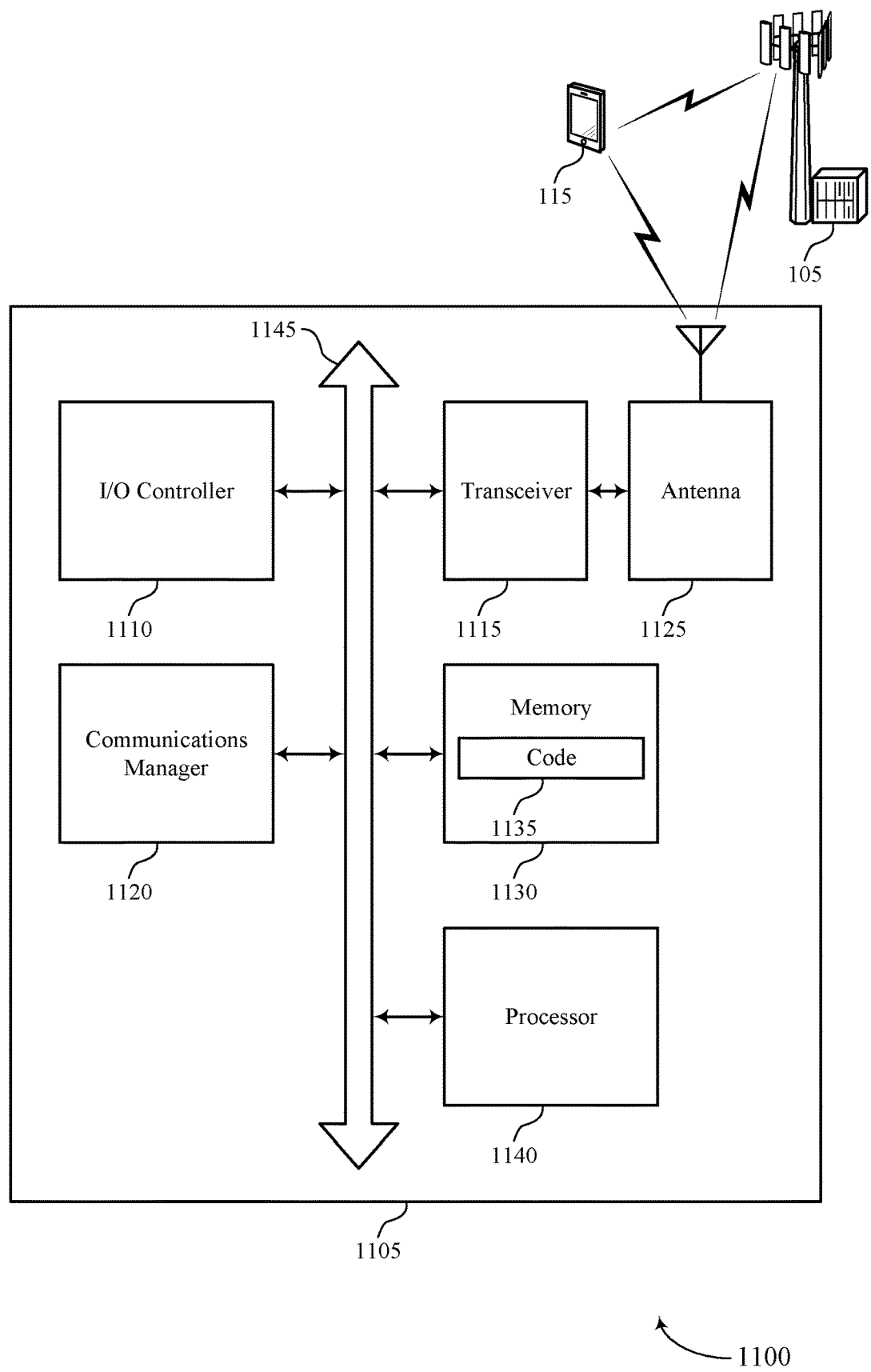
FIG. 11 shows a diagram of a system including a device that supports online spur detection and mitigation in accordance with aspects of the present disclosure.

FIG. 11 shows a diagram of a system 1100 including a device 1105 that supports online spur detection and mitigation in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting online spur detection and mitigation). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for monitoring a set of multiple reference signal tones of a first symbol period to identify a noise spur at a first reference signal tone of the set of multiple reference signal tones. The communications manager 1120 may be configured as or otherwise support a means for generating a channel estimate corresponding to the first reference signal tone based on performing a spur reduction procedure on the first reference signal tone. The communications manager 1120 may be configured as or otherwise support a means for performing noise equalization on at least a second tone, of a second symbol period, adjacent to the first reference signal tone. The communications manager 1120 may be configured as or otherwise support a means for demodulating the second tone based on the noise equalization and the channel estimate.

By including or configuring the communications manager 1120 in accordance with examples as described herein, the device 1105 may support techniques for spur detection and mitigation, which may result in improved channel estimation, more efficient wireless communications, improved accuracy of channel decoding, decreased system latency, improved reliability of wireless communications, and improved user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of online spur detection and mitigation as described herein, or the processor 1140 and the memory 1130 may be otherwise configured to perform or support such operations.

Figure 12:
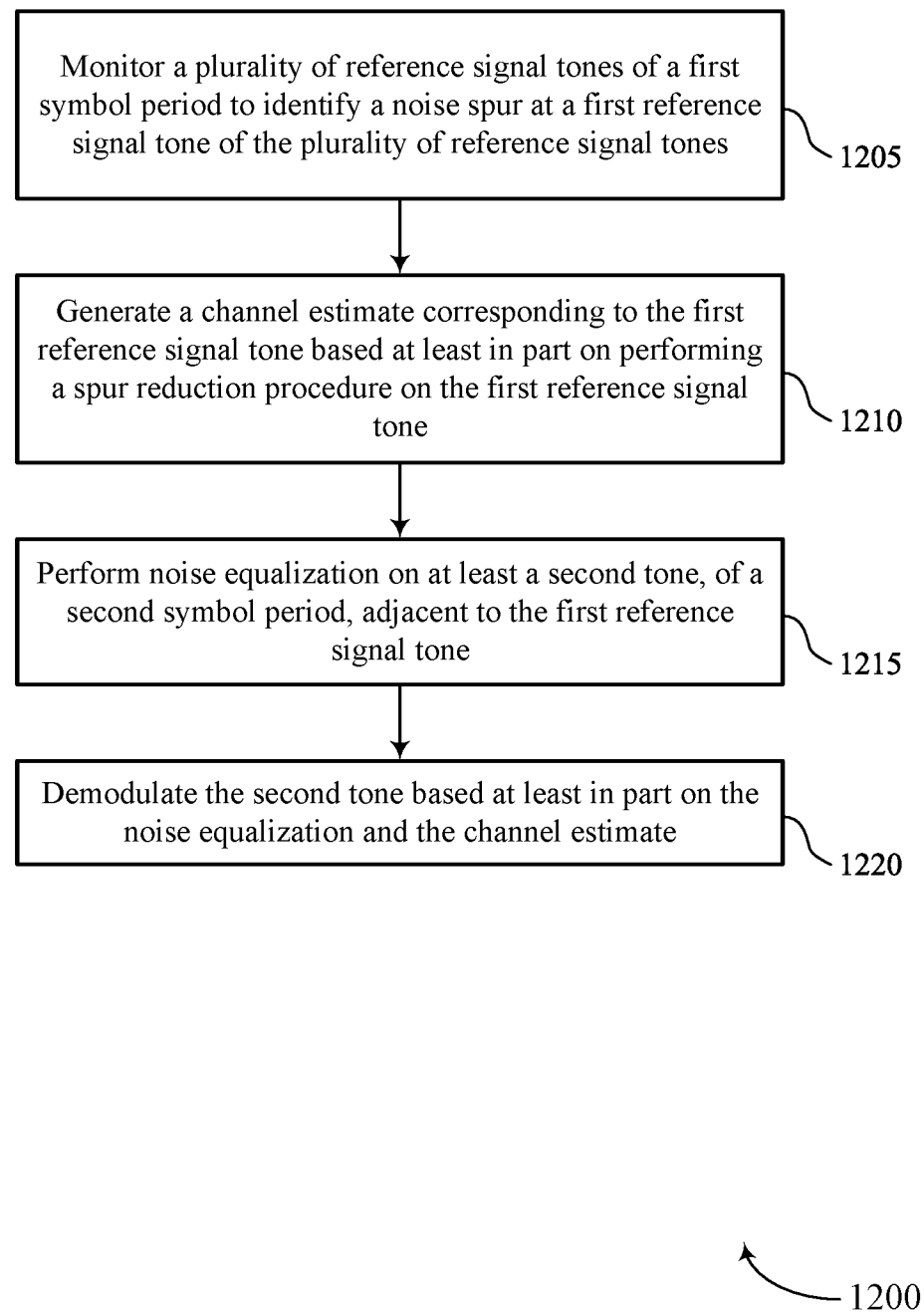
FIGS. 12 through 14 show flowcharts illustrating methods that support online spur detection and mitigation in accordance with aspects of the present disclosure.

FIG. 12 shows a flowchart illustrating a method 1200 that supports online spur detection and mitigation in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include monitoring a set of multiple reference signal tones of a first symbol period to identify a noise spur at a first reference signal tone of the set of multiple reference signal tones. The operations of 1205 may be performed in accordance with examples as disclosed herein. In some examples, aspects of the operations of 1205 may be performed by a monitoring manager 1025 as described with reference to FIG. 10.

At 1210, the method may include generating a channel estimate corresponding to the first reference signal tone based on performing a spur reduction procedure on the first reference signal tone. The operations of 1210 may be performed in accordance with examples as disclosed herein. In some examples, aspects of the operations of 1210 may be performed by a channel estimate manager 1030 as described with reference to FIG. 10.

At 1215, the method may include performing noise equalization on at least a second tone, of a second symbol period, adjacent to the first reference signal tone. The operations of 1215 may be performed in accordance with examples as disclosed herein. In some examples, aspects of the operations of 1215 may be performed by a noise equalization manager 1035 as described with reference to FIG. 10.

At 1220, the method may include demodulating the second tone based on the noise equalization and the channel estimate. The operations of 1220 may be performed in accordance with examples as disclosed herein. In some examples, aspects of the operations of 1220 may be performed by a demodulation manager 1040 as described with reference to FIG. 10.

Figure 13:
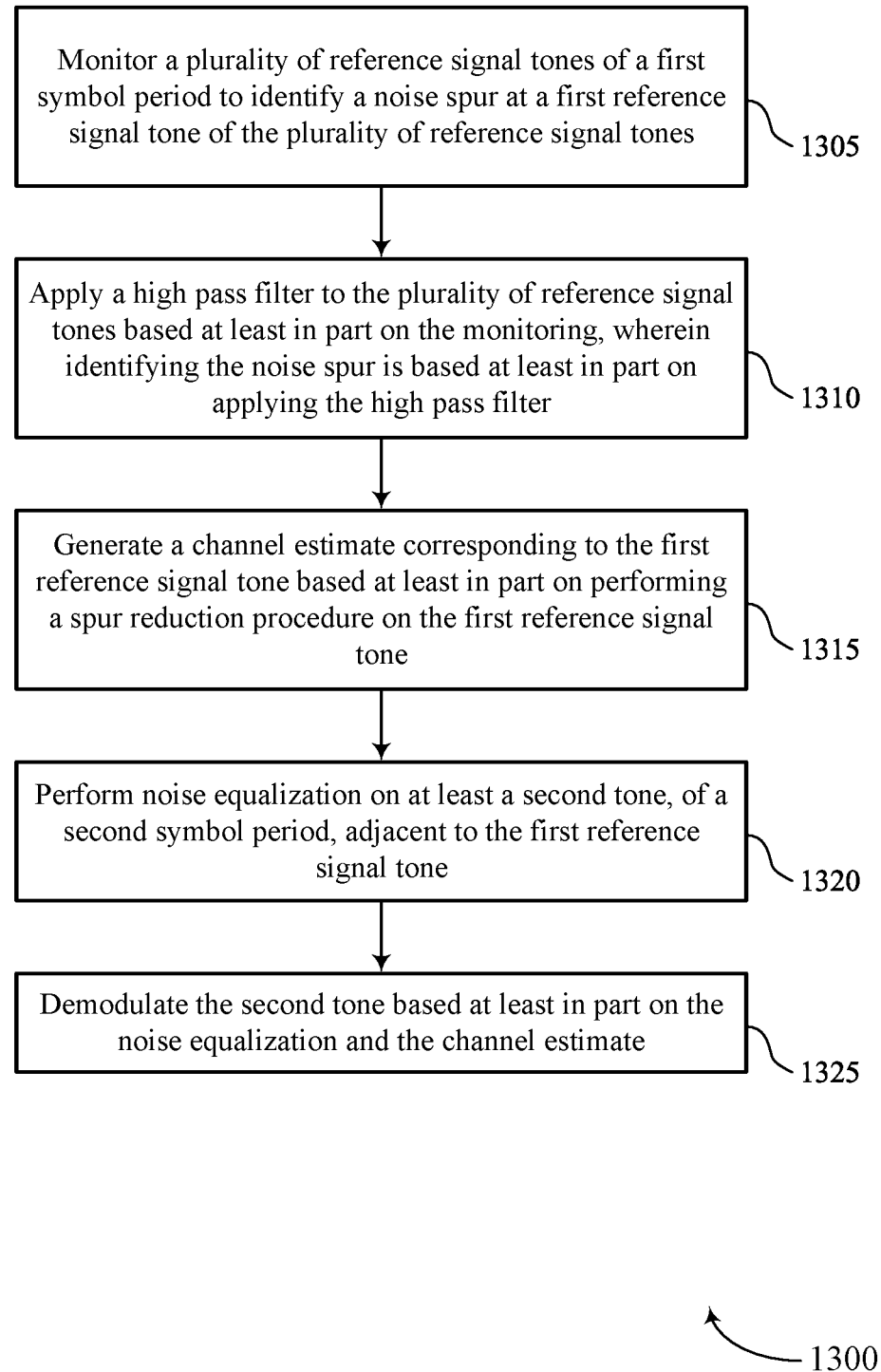

FIG. 13 shows a flowchart illustrating a method 1300 that supports online spur detection and mitigation in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include monitoring a set of multiple reference signal tones of a first symbol period to identify a noise spur at a first reference signal tone of the set of multiple reference signal tones. The operations of 1305 may be performed in accordance with examples as disclosed herein. In some examples, aspects of the operations of 1305 may be performed by a monitoring manager 1025 as described with reference to FIG. 10.

At 1310, the method may include applying a high pass filter to the set of multiple reference signal tones based on the monitoring, where identifying the noise spur is based on applying the high pass filter. The operations of 1310 may be performed in accordance with examples as disclosed herein. In some examples, aspects of the operations of 1310 may be performed by a high pass filter manager 1045 as described with reference to FIG. 10.

At 1315, the method may include generating a channel estimate corresponding to the first reference signal tone based on performing a spur reduction procedure on the first reference signal tone. The operations of 1315 may be performed in accordance with examples as disclosed herein. In some examples, aspects of the operations of 1315 may be performed by a channel estimate manager 1030 as described with reference to FIG. 10.

At 1320, the method may include performing noise equalization on at least a second tone, of a second symbol period, adjacent to the first reference signal tone. The operations of 1320 may be performed in accordance with examples as disclosed herein. In some examples, aspects of the operations of 1320 may be performed by a noise equalization manager 1035 as described with reference to FIG. 10.

At 1325, the method may include demodulating the second tone based on the noise equalization and the channel estimate. The operations of 1325 may be performed in accordance with examples as disclosed herein. In some examples, aspects of the operations of 1325 may be performed by a demodulation manager 1040 as described with reference to FIG. 10.

Figure 14:
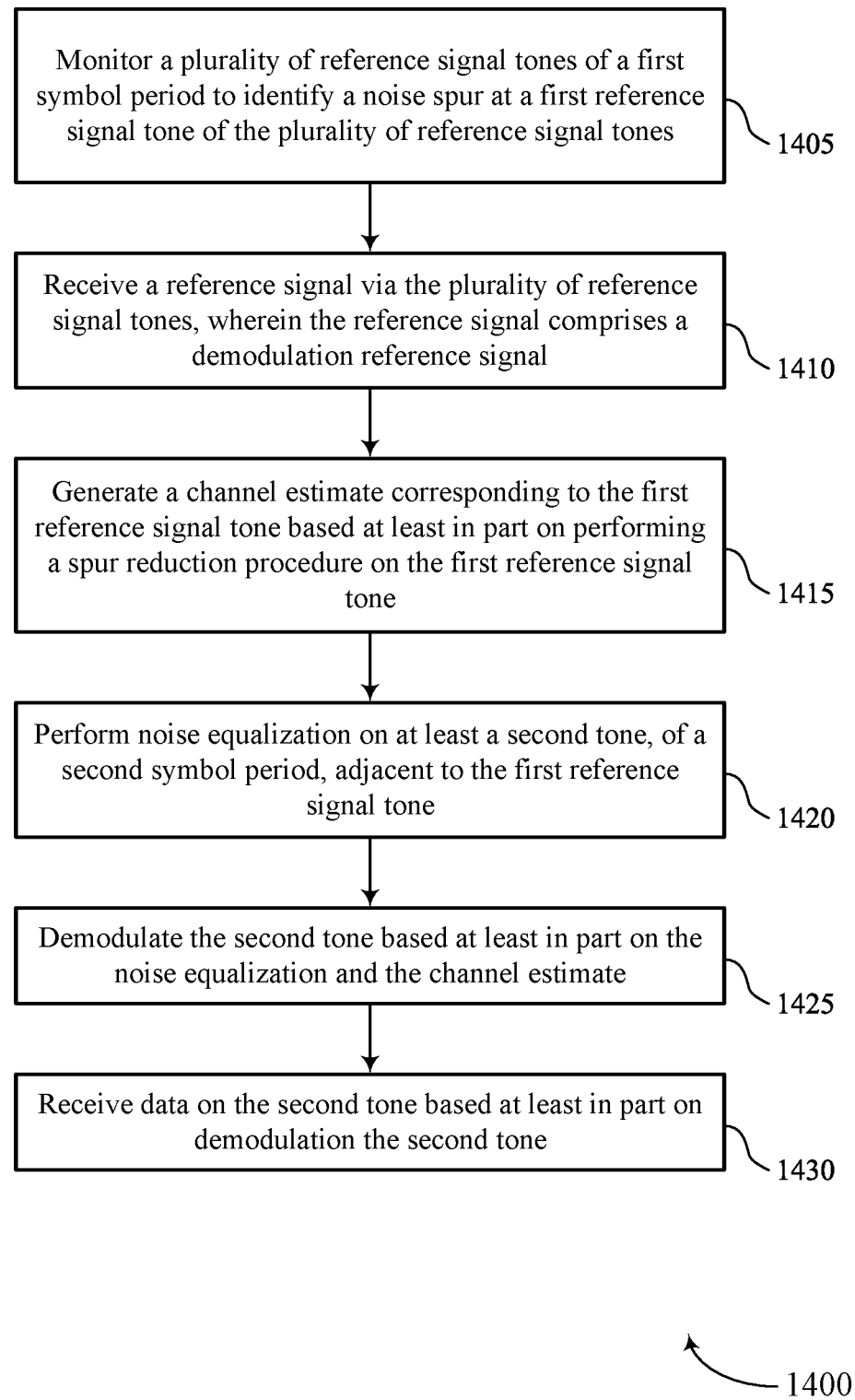

FIG. 14 shows a flowchart illustrating a method 1400 that supports online spur detection and mitigation in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include monitoring a set of multiple reference signal tones of a first symbol period to identify a noise spur at a first reference signal tone of the set of multiple reference signal tones. The operations of 1405 may be performed in accordance with examples as disclosed herein. In some examples, aspects of the operations of 1405 may be performed by a monitoring manager 1025 as described with reference to FIG. 10.

At 1410, the method may include receiving a reference signal via the set of multiple reference signal tones, where the reference signal includes a demodulation reference signal. The operations of 1410 may be performed in accordance with examples as disclosed herein. In some examples, aspects of the operations of 1410 may be performed by a DMRS manager 1055 as described with reference to FIG. 10.

At 1415, the method may include generating a channel estimate corresponding to the first reference signal tone based on performing a spur reduction procedure on the first reference signal tone. The operations of 1415 may be performed in accordance with examples as disclosed herein. In some examples, aspects of the operations of 1415 may be performed by a channel estimate manager 1030 as described with reference to FIG. 10.

At 1420, the method may include performing noise equalization on at least a second tone, of a second symbol period, adjacent to the first reference signal tone. The operations of 1420 may be performed in accordance with examples as disclosed herein. In some examples, aspects of the operations of 1420 may be performed by a noise equalization manager 1035 as described with reference to FIG. 10.

At 1425, the method may include demodulating the second tone based on the noise equalization and the channel estimate. The operations of 1425 may be performed in accordance with examples as disclosed herein. In some examples, aspects of the operations of 1425 may be performed by a demodulation manager 1040 as described with reference to FIG. 10.

At 1430, the method may include receiving data on the second tone based on demodulation the second tone. The operations of 1430 may be performed in accordance with examples as disclosed herein. In some examples, aspects of the operations of 1430 may be performed by a demodulation manager 1040 as described with reference to FIG. 10.

The following provides an overview of aspects of the present disclosure:

Aspect 1: A method for wireless communications at a UE, comprising: monitoring a plurality of reference signal tones of a first symbol period to identify a noise spur at a first reference signal tone of the plurality of reference signal tones; generating a channel estimate corresponding to the first reference signal tone based at least in part on performing a spur reduction procedure on the first reference signal tone; performing noise equalization on at least a second tone, of a second symbol period, adjacent to the first reference signal tone; and demodulating the second tone based at least in part on the noise equalization and the channel estimate.

Aspect 2: The method of aspect 1, further comprising: applying a high pass filter to the plurality of reference signal tones based at least in part on the monitoring, wherein identifying the noise spur is based at least in part on applying the high pass filter.

Aspect 3: The method of aspect 2, further comprising: estimating a first channel noise level for at least a second reference signal tone of the plurality of reference signal tones; detecting a second channel noise level for the first reference signal tone; and identifying the noise spur at the first reference signal tone based at least in part on the first channel noise level and the second channel noise level.

Aspect 4: The method of aspect 3, further comprising: determining to apply the high pass filter based at least in part on the first channel noise level differing from the second channel noise level by at least a threshold amount.

Aspect 5: The method of any of aspects 3 through 4, wherein a signal received via the first reference signal tone, and the second reference signal tone, is communicated using a same set of one or more parameters.

Aspect 6: The method of aspect 5, wherein the one or more parameters comprise a port combination, an orthogonal cover code set, a port comb, or any combination thereof.

Aspect 7: The method of any of aspects 2 through 6, wherein identifying the noise spur comprises: identifying a location of a center of the spur, wherein the spur reduction procedure is performed corresponding to the location of the center of the spur.

Aspect 8: The method of any of aspects 1 through 7, wherein performing the noise equalization comprises: performing a channel estimation procedure to the first reference signal tone to determine a first channel estimate; adjusting the channel estimate by removing a noise spur estimate determined by the spur reduction procedure for the noise spur to generate the channel estimate corresponding to the first reference signal tone; and performing a noise equalization procedure on the second tone of the second symbol using one or more noise whitening parameters corresponding to the noise spur estimate.

Aspect 9: The method of any of aspects 1 through 8, wherein performing the noise equalization comprises: performing a channel noise estimation procedure for the first reference signal tone based at least in part on the spur reduction procedure; adjusting the channel noise estimation by adding the noise spur to the estimated channel noise of the first reference signal tone; and reducing the noise for the second tone of the second symbol by applying the noise equalization procedure using one or more noise whitening parameters corresponding to the adjusted channel.

Aspect 10: The method of any of aspects 1 through 9, further comprising: receiving a reference signal via the plurality of reference signal tones, wherein the reference signal comprises a demodulation reference signal.

Aspect 11: The method of any of aspects 1 through 10, further comprising: receiving data on the second tone based at least in part on demodulation the second tone.

Aspect 12: The method of any of aspects 1 through 11, wherein a frequency resource of the second tone is the same as a frequency resource of the first reference signal tone.

Aspect 13: The method of any of aspects 1 through 12, further comprising: decoding one or more bits from the second tone based at least in part on the demodulating.

Aspect 14: An apparatus for wireless communications at a UE, comprising a processor; memory coupled with the processor; and instructions stored in the memory and executable by the processor to cause the apparatus to perform a method of any of aspects 1 through 13.

Aspect 15: An apparatus for wireless communications at a UE, comprising at least one means for performing a method of any of aspects 1 through 13.

Aspect 16: A non-transitory computer-readable medium storing code for wireless communications at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   monitoring a plurality of reference signal tones of a first symbol period to identify a noise spur at a first reference signal tone of the plurality of reference signal tones;
   generating a channel estimate corresponding to the first reference signal tone based at least in part on performing a spur reduction procedure on the first reference signal tone;
   performing noise equalization on at least a second tone, of a second symbol period, adjacent to the first reference signal tone; and
   demodulating the second tone based at least in part on the noise equalization on at least the second tone and the channel estimate corresponding to the first reference signal tone.

2. The method of claim 1, further comprising:
   applying a high pass filter to the plurality of reference signal tones based at least in part on the monitoring, wherein identifying the noise spur is based at least in part on applying the high pass filter.

3. The method of claim 2, further comprising:
   estimating a first channel noise level for at least a second reference signal tone of the plurality of reference signal tones;
   detecting a second channel noise level for the first reference signal tone; and
   identifying the noise spur at the first reference signal tone based at least in part on the first channel noise level and the second channel noise level.

4. The method of claim 3, further comprising:
   determining to apply the high pass filter based at least in part on the first channel noise level differing from the second channel noise level by at least a threshold amount.

5. The method of claim 3, wherein a signal received via the first reference signal tone, and the second reference signal tone, is communicated using a same set of one or more parameters.

6. The method of claim 5, wherein the one or more parameters comprise a port combination, an orthogonal cover code set, a port comb, or any combination thereof.

7. The method of claim 2, wherein identifying the noise spur comprises:
   identifying a location of a center of the noise spur, wherein the spur reduction procedure is performed corresponding to the location of the center of the noise spur.

8. The method of claim 1, wherein performing the noise equalization comprises:
   performing a channel estimation procedure to the first reference signal tone to determine a first channel estimate;
   adjusting the channel estimate by removing a noise spur estimate determined by the spur reduction procedure for the noise spur to generate the channel estimate corresponding to the first reference signal tone; and
   performing a noise equalization procedure on the second tone of the second symbol using one or more noise whitening parameters corresponding to the noise spur estimate.

9. The method of claim 1, wherein performing the noise equalization comprises:
   performing a channel estimation procedure for the first reference signal tone based at least in part on the spur reduction procedure;
   adjusting the channel estimate by adding the noise spur to an estimated channel noise of the first reference signal tone; and
   reducing a channel noise for the second tone of the second symbol by applying a noise equalization procedure using one or more noise whitening parameters corresponding to the adjusted channel estimate.

10. The method of claim 1, further comprising:
    receiving a reference signal via the plurality of reference signal tones, wherein the reference signal comprises a demodulation reference signal.

11. The method of claim 1, further comprising:
    receiving data on the second tone based at least in part on demodulation the second tone.

12. The method of claim 1, wherein a frequency resource of the second tone is the same as a frequency resource of the first reference signal tone.

13. The method of claim 1, further comprising:
    decoding one or more bits from the second tone based at least in part on the demodulating.

14. An apparatus for wireless communications at a user equipment (UE), comprising:
    a processor;
    memory coupled with the processor; and
    instructions stored in the memory and executable by the processor to cause the apparatus to:
      monitor a plurality of reference signal tones of a first symbol period to identify a noise spur at a first reference signal tone of the plurality of reference signal tones;
      generate a channel estimate corresponding to the first reference signal tone based at least in part on performing a spur reduction procedure on the first reference signal tone;

perform noise equalization on at least a second tone, of a second symbol period, adjacent to the first reference signal tone; and demodulate the second tone based at least in part on the noise equalization on at least the second tone and the channel estimate corresponding to the first reference signal tone.

15. The apparatus of claim 14, wherein the instructions are further executable by the processor to cause the apparatus to:

apply a high pass filter to the plurality of reference signal tones based at least in part on the monitoring, wherein identifying the noise spur is based at least in part on applying the high pass filter.

16. The apparatus of claim 15, wherein the instructions are further executable by the processor to cause the apparatus to:

estimate a first channel noise level for at least a second reference signal tone of the plurality of reference signal tones;

detect a second channel noise level for the first reference signal tone; and identify the noise spur at the first reference signal tone based at least in part on the first channel noise level and the second channel noise level.

17. The apparatus of claim 16, wherein the instructions are further executable by the processor to cause the apparatus to:

determine to apply the high pass filter based at least in part on the first channel noise level differing from the second channel noise level by at least a threshold amount.

18. The apparatus of claim 16, wherein a signal received via the first reference signal tone, and the second reference signal tone, is communicated using a same set of one or more parameters.

19. The apparatus of claim 18, wherein the one or more parameters comprise a port combination, an orthogonal cover code set, a port comb, or any combination thereof.

20. The apparatus of claim 15, wherein the instructions to identify the noise spur are executable by the processor to cause the apparatus to:

identify a location of a center of the noise spur, wherein the spur reduction procedure is performed corresponding to the location of the center of the noise spur.

21. The apparatus of claim 14, wherein the instructions to perform the noise equalization are executable by the processor to cause the apparatus to:

perform a channel estimation procedure to the first reference signal tone to determine a first channel estimate;

adjust the channel estimate by removing a noise spur estimate determined by the spur reduction procedure for the noise spur to generate the channel estimate corresponding to the first reference signal tone; and perform a noise equalization procedure on the second tone of the second symbol using one or more noise whitening parameters corresponding to the noise spur estimate.

22. The apparatus of claim 14, wherein the instructions to perform the noise equalization are executable by the processor to cause the apparatus to:

perform a channel estimation procedure for the first reference signal tone based at least in part on the spur reduction procedure;

adjust the channel estimate by adding the noise spur to an estimated channel noise of the first reference signal tone; and reduce a channel noise for the second tone of the second symbol by applying a noise equalization procedure using one or more noise whitening parameters corresponding to the adjusted channel estimate.

23. The apparatus of claim 14, wherein the instructions are further executable by the processor to cause the apparatus to:

receive a reference signal via the plurality of reference signal tones, wherein the reference signal comprises a demodulation reference signal.

24. The apparatus of claim 14, wherein the instructions are further executable by the processor to cause the apparatus to:

receive data on the second tone based at least in part on demodulation the second tone.

25. The apparatus of claim 14, wherein a frequency resource of the second tone is the same as a frequency resource of the first reference signal tone.

26. The apparatus of claim 14, wherein the instructions are further executable by the processor to cause the apparatus to:

decode one or more bits from the second tone based at least in part on the demodulating.

27. An apparatus for wireless communications at a user equipment (UE), comprising:

means for monitoring a plurality of reference signal tones of a first symbol period to identify a noise spur at a first reference signal tone of the plurality of reference signal tones;

means for generating a channel estimate corresponding to the first reference signal tone based at least in part on performing a spur reduction procedure on the first reference signal tone;

means for performing noise equalization on at least a second tone, of a second symbol period, adjacent to the first reference signal tone; and means for demodulating the second tone based at least in part on the noise equalization on at least the second tone and the channel estimate corresponding to the first reference signal tone.

28. A non-transitory computer-readable medium storing code for wireless communications at a user equipment (UE), the code comprising instructions executable by a processor to:

monitor a plurality of reference signal tones of a first symbol period to identify a noise spur at a first reference signal tone of the plurality of reference signal tones;

generate a channel estimate corresponding to the first reference signal tone based at least in part on performing a spur reduction procedure on the first reference signal tone;

perform noise equalization on at least a second tone, of a second symbol period, adjacent to the first reference signal tone; and demodulate the second tone based at least in part on the noise equalization on at least the second tone and the channel estimate corresponding to the first reference signal tone.

29. The non-transitory computer-readable medium of claim 28, wherein the instructions are further executable by the processor to:

apply a high pass filter to the plurality of reference signal tones based at least in part on the monitoring, wherein identifying the noise spur is based at least in part on applying the high pass filter.

30. The non-transitory computer-readable medium of claim 29, wherein the instructions are further executable by the processor to:
- estimate a first channel noise level for at least a second reference signal tone of the plurality of reference signal tones;
- detect a second channel noise level for the first reference signal tone; and
- identify the noise spur at the first reference signal tone based at least in part on the first channel noise level and the second channel noise level.

* * * * *